United States Patent
Lewis et al.

(10) Patent No.: US 10,016,731 B2
(45) Date of Patent: Jul. 10, 2018

(54) FUEL ENRICHMENT METHOD AND DEVICE

(75) Inventors: David Charles Colin Lewis, Gloucestershire (GB); Christopher Leonard Smith, Gloucestershire (GB); John Richard Lister, Gloucestershire (GB)

(73) Assignee: ADVANCED FUEL TECHNOLOGIES UK LIMITED, Gloucestershire (GB)

( * ) Notice: Subject to any disclaimer, the term of this patent is extended or adjusted under 35 U.S.C. 154(b) by 750 days.

(21) Appl. No.: 13/639,985

(22) PCT Filed: Nov. 9, 2010

(86) PCT No.: PCT/GB2010/051862
§ 371 (c)(1),
(2), (4) Date: Feb. 6, 2013

(87) PCT Pub. No.: WO2011/124872
PCT Pub. Date: Oct. 13, 2011

(65) Prior Publication Data
US 2013/0125454 A1    May 23, 2013

(30) Foreign Application Priority Data

Apr. 8, 2010  (GB) .................................. 1005918.6
Apr. 8, 2010  (GB) .................................. 1005920.2
Apr. 8, 2010  (GB) .................................. 1005924.4

(51) Int. Cl.
*C10L 1/12*    (2006.01)
*C01B 6/00*    (2006.01)
(Continued)

(52) U.S. Cl.
CPC ........ *B01F 3/04439* (2013.01); *C10L 1/1208* (2013.01); *F02M 25/12* (2013.01);
(Continued)

(58) Field of Classification Search
CPC ... B01F 3/04439; C10L 1/1208; F02M 25/12; F02M 27/045; F02M 31/02; Y02E 60/364; Y02E 60/366; Y02T 10/121
(Continued)

(56) References Cited

U.S. PATENT DOCUMENTS 1,379,077 A    5/1921   Blumenberg
4,017,268 A    4/1977   Gilley
(Continued)

FOREIGN PATENT DOCUMENTS

CN    101153715 A      4/2008
CN    101263287 A  *   9/2008
(Continued)

OTHER PUBLICATIONS

International Search Report for PCT/GB2010/051862, completed on Jan. 31, 2011 (5 pages).

*Primary Examiner* — Latosha Hines
(74) *Attorney, Agent, or Firm* — Banner & Witcoff, Ltd.

(57) ABSTRACT

The present invention relates, inter alia, to a process for enriching a hydrocarbon fuel for use in an internal combustion engine, the process comprising: (i) contacting a hydrocarbon fuel with a gas stream containing hydrogen gas such that at least some of the hydrogen gas is introduced into the hydrocarbon fuel to produce an enriched hydrocarbon fuel; and optionally (ii) delivering the enriched hydrocarbon fuel to an internal combustion engine. The present invention further provides a device for use in the process.

10 Claims, 5 Drawing Sheets

(51) Int. Cl.
  *B01F 3/04* (2006.01)
  *F02M 25/12* (2006.01)
  *F02M 27/04* (2006.01)
  *F02M 31/02* (2006.01)
(52) U.S. Cl.
  CPC ............ *F02M 27/045* (2013.01); *F02M 31/02* (2013.01); *Y02E 60/364* (2013.01); *Y02E 60/366* (2013.01); *Y02T 10/121* (2013.01)
(58) Field of Classification Search
  USPC ............................................ 44/457; 422/162
  See application file for complete search history.

(56) References Cited

U.S. PATENT DOCUMENTS

| | | | |
|---|---|---|---|
| 4,382,189 A | 5/1983 | Wilson | |
| 5,178,118 A | 1/1993 | Nakamats | |
| 7,021,249 B1* | 4/2006 | Christison | 123/3 |
| 7,458,368 B1* | 12/2008 | Huffman | F02M 25/12 123/525 |
| 2002/0017271 A1* | 2/2002 | Suckewer | F02D 19/081 123/297 |
| 2003/0217506 A1* | 11/2003 | Dieckmann et al. | 44/412 |
| 2006/0090712 A1* | 5/2006 | Ehresman | 123/3 |
| 2007/0277438 A1* | 12/2007 | Lynch et al. | 48/197 R |
| 2008/0017137 A1* | 1/2008 | VanHoose | F02B 43/12 123/3 |
| 2008/0223344 A1* | 9/2008 | Suzuki et al. | 123/525 |
| 2011/0220039 A1* | 9/2011 | Nowicki | C25B 9/06 123/3 |

FOREIGN PATENT DOCUMENTS

| | | |
|---|---|---|
| CN | 201428532 Y | 3/2010 |
| GB | 11756 | 4/1914 |
| JP | 3005896 U | 1/1995 |
| JP | 10131815 A | 5/1998 |
| JP | 2004245137 A | 9/2004 |
| JP | 2007024012 A | 2/2007 |
| RU | 2167317 C2 | 5/2001 |
| RU | 2168649 | 6/2001 |
| WO | 2004039874 A1 | 5/2004 |
| WO | 2006126341 A2 | 11/2006 |
| WO | 2007031848 A2 | 3/2007 |
| WO | 2007142728 A2 | 12/2007 |
| WO | 2008012632 A2 | 1/2008 |

* cited by examiner

FUEL ENRICHMENT METHOD AND DEVICE

CROSS REFERENCE TO RELATED APPLICATIONS

This is a U.S. National Phase Application under 35 U.S.C. § 371 of International Application No. PCT/GB2010/051862, filed Nov. 9, 2010, which was published under PCT Article 21(2) and claims priority to United Kingdom Patent Application Nos. GB 1005918.6, GB 1005924.4 and GB 1005920.2, all filed Apr. 8, 2010, the entire contents of which are incorporated herein by reference in their entireties for any and all non-limiting purposes.

FIELD OF THE INVENTION

The present invention relates to the enrichment of hydrocarbon fuels, particularly for use with internal combustion engines. The present invention provides methods and devices for the enrichment of hydrocarbon fuels.

BACKGROUND

Current internal combustion engine fuel systems utilise a petrol/air or a diesel/air mixture which is subsequently ignited in the combustion chamber. A large and varied number of fuel systems for use on internal combustion engines exist. A typical example is that of a petrol fuelled system that will utilise a carburettor in which the liquid fuel (petrol) is vaporised via a venturi through which atmospheric air is fed. The fuel vapour/air mixture is subsequently drawn into the intake manifold of the engine and finally into the cylinders where it is ignited by a spark. Engines running a diesel/air mixture use a fuel injection system whereby the fuel is injected into the combustion chamber under high pressure; this does not require the use of a spark for ignition.

Hydrogen generators, utilising electrolysis to break down water into hydrogen and oxygen, have been in existence for many years. The electrolysis works by passing an electric current though water ($H_2O$) which causes the water to revert to its' original constituent gases. At the negatively charged cathode, a reduction reaction takes place, with electrons (e−) from the cathode being given to hydrogen cations (positively charged ions) to form hydrogen gas:

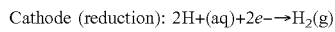

Cathode (reduction): $2H+(aq)+2e- \rightarrow H_2(g)$

At the positively charged anode, an oxidation reaction occurs, generating oxygen gas and giving electrons to the cathode to complete the circuit:

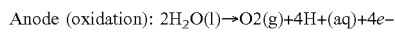

Anode (oxidation): $2H_2O(l) \rightarrow O_2(g)+4H+(aq)+4e-$

Electrolytic hydrogen generators have been used for enhancing the fuel efficiency of internal combustion engines. Such generators are sometimes termed HHO generators. Typically, hydrogen and oxygen produced in an electrolytic cell is fed into the air intake manifold of an internal combustion engine, which has been found to increase the fuel efficiency of the internal combustion engines.

The present invention aims to improve or provide an alternative to the devices of the prior art.

SUMMARY OF THE INVENTION

The present invention provides, in a first aspect, a process for enriching a hydrocarbon fuel for use in an internal combustion engine, the process comprising:

(i) contacting a hydrocarbon fuel with hydrogen gas and optionally oxygen gas such that at least some of the hydrogen gas and, if present, oxygen gas is introduced into the hydrocarbon fuel to produce an enriched hydrocarbon fuel. The process may further provide, after step (i):

(ii) delivering the enriched hydrocarbon fuel to an internal combustion engine. The process may involve contacting the hydrocarbon fuel with a gas stream containing the hydrogen gas and a gas stream containing the oxygen gas, such that at least some of the hydrogen gas and/or oxygen gas is introduced into the hydrocarbon fuel to produce the enriched hydrocarbon fuel. The process may involve contacting a gas stream containing the hydrogen gas and the oxygen gas with the hydrocarbon fuel, such that at least some of the hydrogen gas and/or oxygen gas is introduced into the hydrocarbon fuel to produce the enriched hydrocarbon fuel.

The present invention provides, in a first aspect, a process for enriching a hydrocarbon fuel for use in an internal combustion engine, the process comprising:

(i) contacting a hydrocarbon fuel with a gas stream containing hydrogen gas such that at least some of the hydrogen gas is introduced into the hydrocarbon fuel to produce an enriched hydrocarbon fuel. The process may further provide, after step (i):

(ii) delivering the enriched hydrocarbon fuel to an internal combustion engine.

In an embodiment, the present invention provides, in a first aspect, a process for enriching a hydrocarbon fuel for use in an internal combustion engine, the process comprising:

(i) contacting a hydrocarbon fuel with a gas stream containing hydrogen gas such that at least some of the hydrogen gas is introduced into the hydrocarbon fuel to produce an enriched hydrocarbon fuel; and (ii) delivering the enriched hydrocarbon fuel to an internal combustion engine.

In second aspect, the present invention provides a process for enriching a hydrocarbon fuel, the process comprising:

generating hydrogen gas and oxygen gas in an electrolytic process from water to produce a gas stream containing hydrogen gas and optionally oxygen gas, and contacting the gas stream with the hydrocarbon fuel such that at least some of the hydrogen gas is introduced into the hydrocarbon fuel to produce an enriched hydrocarbon fuel.

In a third aspect, the present invention provides a device for carrying out a process for enriching a hydrocarbon fuel for use in an internal combustion engine, the device adapted to carrying out the process comprising:

(i) contacting a hydrocarbon fuel with hydrogen gas and optionally oxygen gas such that at least some of the hydrogen gas and, if present, oxygen gas is introduced into the hydrocarbon fuel to produce an enriched hydrocarbon fuel. The device may be further adapted such that it can, after step (i): (ii) deliver the enriched hydrocarbon fuel to an internal combustion engine.

In a third aspect, the present invention provides a device for enriching hydrocarbon fuel, the device comprising:

a hydrogen source for producing a gas stream containing hydrogen, an enriching unit for contacting a hydrocarbon fuel and a gas stream containing hydrogen such that at least some of the hydrogen gas is introduced into the hydrocarbon fuel to produce an enriched hydrocarbon fuel, the hydrogen source being in fluid connection with the enriching unit such that the gas stream containing hydrogen is passed to the enriching unit, the enriching unit having an inlet for the hydrocarbon fuel, and an outlet for the enriched hydrocarbon fuel. Optionally, the device may further comprise an oxygen source for producing a gas stream containing oxygen, and the enriching unit is for contacting a hydrocarbon fuel and the gas stream containing oxygen such that at least some of the oxygen gas is introduced into the hydrocarbon fuel to produce an enriched hydrocarbon fuel, the oxygen source being in fluid connection with the enriching unit such that the gas stream containing oxygen is passed to the enriching unit. The gas stream containing hydrogen and the gas stream containing oxygen may be the same gas stream or different gas streams. The hydrogen source may be the same source as the oxygen source or a different source from the oxygen source. In an embodiment, the enriching unit may comprise a pressurisation unit for contacting the hydrocarbon fuel and the hydrogen and optionally oxygen under pressure. The pressurisation of the hydrogen and oxygen may be by compressing the gases. In an embodiment, the hydrogen source may be such that it supplies sufficient hydrogen and optionally oxygen to the enriching unit, such that a desired pressure is created within the enriching unit and under which the hydrogen and optionally oxygen are contacted with the hydrocarbon fuel.

In a third aspect, the present invention provides a device for enriching hydrocarbon fuel, the device comprising:
  a hydrogen production unit for producing a gas stream containing hydrogen,
  an enriching unit for contacting a hydrocarbon fuel and a gas stream containing hydrogen such that at least some of the hydrogen gas is introduced into the hydrocarbon fuel to produce an enriched hydrocarbon fuel, the hydrogen production unit being in fluid connection with the enriching unit such that the gas stream containing hydrogen is passed to the enriching unit, the enriching unit having an inlet for the hydrocarbon fuel, and
  an outlet for the enriched hydrocarbon fuel. Optionally, the device may further comprise an oxygen production unit for producing a gas stream containing oxygen, and the enriching unit is for contacting a hydrocarbon fuel and the gas stream containing oxygen such that at least some of the oxygen gas is introduced into the hydrocarbon fuel to produce an enriched hydrocarbon fuel, the oxygen production unit being in fluid connection with the enriching unit such that the gas stream containing oxygen is passed to the enriching unit. The gas stream containing hydrogen and the gas stream containing oxygen may be the same gas stream or different gas streams. The hydrogen production unit may be the same unit as the oxygen production unit or a different unit from the oxygen production unit.

In a fourth aspect, the present invention provides an internal combustion engine having a device of the present invention attached thereto, the device having a conduit for delivery of the enriched hydrocarbon fuel to a fuel and/or air intake of the internal combustion engine.

In recent times one of the major concerns related to internal combustion engines has been their emissions, both NOx (oxides of nitrogen) and COx (carbon monoxide and carbon dioxide). The device of the present invention can be used with any hydrocarbon fuel-based combustion engine to reduce the NOx output and the COx "footprint". This is achieved by addition of the hydrogen and optionally oxygen to the combustion process to give far more efficient combustion characteristics due to the high speed/high temperature hydrogen combustion which improves the vehicle economy; the NOx output is reduced because some of the nitrogen containing air is displaced from the hydrocarbon fuel and also because of the contained combustion volume. This also reduces the overall engine temperature since heat transfer from the combustion process is minimised.

In at least some circumstances, the addition of the hydrogen to the hydrocarbon fuel has been found to improve the combustion of the fuel to such a degree that particulate output is dramatically reduced (in some circumstances, almost to zero on diesel engines). In addition the process has been found to clean carbon deposits from engines that have built up over time, thus reducing the overall friction of the engine (and hence further improving the efficiency). Finally, the fuel/oxidiser (e.g. air) mixture can be made much leaner due to the addition of the hydrogen which has a much higher equivalent octane rating than petrol, thus increasing the COx:fuel ratio (and hence reducing the carbon footprint).

Whilst hydrogen/oxygen gas generators that can be used with internal combustion engines have been available to buy for a few years the nature of use has been relatively simple i.e. mixing of the produced gas with the fuel and air in the turbo manifold. The process of the present invention greatly enhances the way the gas is used to give optimised performance, which, in one embodiment, is by introducing the gases into the fuel under compression in a pressurisation unit. This displaces unwanted dissolved gases in the fuel such as nitrogen and increases the octane rating of the fuel.

Figure 1:
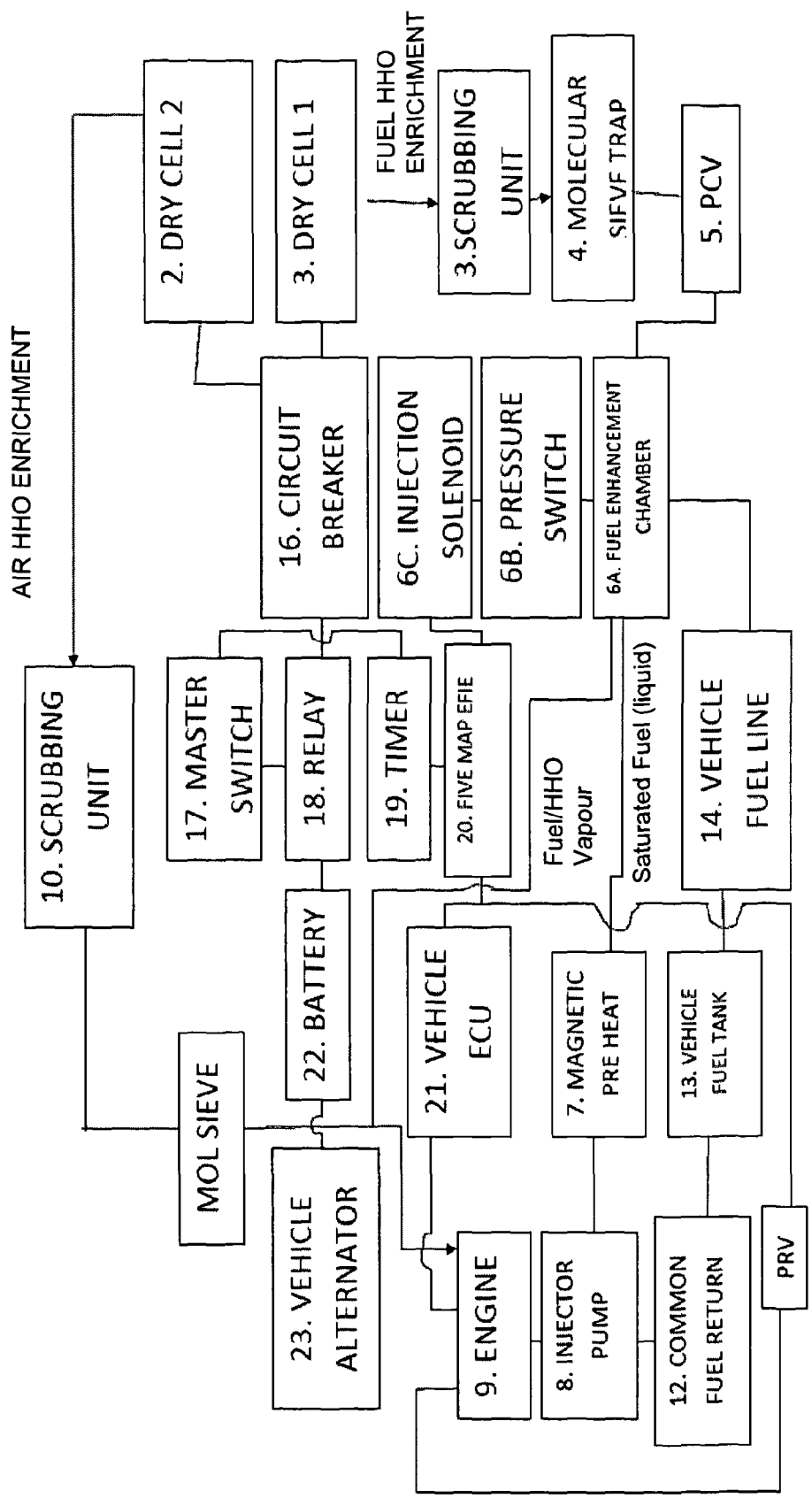
FIG. 1 shows a diagrammatic block view of an embodiment of the device of the present invention attached to an internal combustion engine.

These drawings are referred to in the detailed description which follows.

DETAILED DESCRIPTION OF THE INVENTION

The present invention provides, in a first aspect, a process for enriching a hydrocarbon fuel for use in an internal combustion engine, the process comprising:
  (i) contacting a hydrocarbon fuel with hydrogen gas and optionally oxygen gas such that at least some of the hydrogen gas and, if present, oxygen gas is introduced into the hydrocarbon fuel to produce an enriched hydrocarbon fuel. The process may further provide, after step (i):
  (ii) delivering the enriched hydrocarbon fuel to an internal combustion engine. The process may involve contacting the hydrocarbon fuel with a gas stream containing the hydrogen gas and a gas stream containing the oxygen gas, such that at least some of the hydrogen gas and oxygen gas is introduced into the hydrocarbon fuel to produce the enriched hydrocarbon fuel. The gas stream containing the hydrogen gas and the gas stream containing the oxygen gas may be the same stream or different gas streams, preferably the same gas stream. In an alternative embodiment, the process may involve providing gas containing hydrogen gas and optionally oxygen gas and passing the liquid hydrocarbon fuel through the gas containing hydrogen gas and optionally oxygen gas, such that at least some of the hydrogen and optionally oxygen is incorporated into the hydrocarbon fuel, which may involve for example, if the hydrocarbon fuel is a liquid hydrocarbon fuel, spraying the liquid hydrocarbon fuel into the gas containing the hydrogen gas and optionally oxygen gas. The process may involve contacting the hydrogen gas and/or the oxygen gas with the hydrocarbon fuel, such that at least some of the hydrogen gas and/or oxygen gas is introduced into the hydrocarbon fuel to produce the enriched hydrocarbon fuel. Preferably, the hydrogen gas and/or oxygen gas is contacted with the hydrocarbon fuel under a pressure of about 1 bar or more, optionally at a pressure of about 1.1 bar or more, optionally at a pressure of about 1.2 bar or more, optionally at a pressure of about 1.3 bar or more, optionally at a pressure of about 1.4 bar or more, optionally at a pressure of about 1.5 bar or more, optionally at a pressure of about 1.7 bar or more, optionally at a pressure of about 2 bar or more, optionally at a pressure of about 3 bar or more, optionally at a pressure of about 4 bar or more, optionally at a pressure of about 5 bar or more, optionally at a pressure of about 6 bar or more, optionally at a pressure of about 8 bar or more, optionally at a pressure of about 10 bar or more, optionally at a pressure of about 15 bar or more, optionally at a pressure of about 20 bar or more, optionally at a pressure of about 25 bar or more, optionally at a pressure of about 30 bar or more. Optionally, in the process of either the first or second aspect, preferably, the hydrogen gas and/or oxygen gas is contacted with the hydrocarbon fuel under a pressure of from about 1 bar to about 10 bar, optionally about 1 bar to about 8 bar, optionally about 1 bar to about 7 bar, optionally about 1 bar to about 5 bar, optionally about 1.5 bar to about 4 bar.

The present invention provides, in a first aspect, a process for enriching a hydrocarbon fuel for use in an internal combustion engine, the process comprising:
(i) contacting a hydrocarbon fuel with a gas stream containing hydrogen gas such that at least some of the hydrogen gas is introduced into the hydrocarbon fuel to produce an enriched hydrocarbon fuel. The process may further provide, after step (i):
(ii) delivering the enriched hydrocarbon fuel to an internal combustion engine.

In an embodiment, the present invention provides, in a first aspect, a process for enriching a hydrocarbon fuel for use in an internal combustion engine, the process comprising:
(i) contacting a hydrocarbon fuel with a gas stream containing hydrogen gas such that at least some of the hydrogen gas is introduced into the hydrocarbon fuel to produce an enriched hydrocarbon fuel; and
(ii) delivering the enriched hydrocarbon fuel to an internal combustion engine.

The process of the first aspect may comprise
prior to step (i), generating hydrogen gas and oxygen gas in an electrolytic process from water to produce a gas stream containing hydrogen gas and optionally oxygen gas,
in step (i), contacting the gas stream with the hydrocarbon fuel such that at least some of the hydrogen gas is introduced into the hydrocarbon fuel to produce the enriched hydrocarbon fuel; and, optionally,
(ii) delivering the enriched hydrocarbon fuel to the internal combustion engine. Optionally, the water may contain an electrolyte.

In a second aspect, the present invention provides a process for enriching a hydrocarbon fuel, the process comprising:
generating hydrogen gas and oxygen gas in an electrolytic process from water to produce a gas stream containing hydrogen gas and optionally oxygen gas, and
contacting the gas stream with the hydrocarbon fuel such that at least some of the hydrogen gas is introduced into the hydrocarbon fuel to produce an enriched hydrocarbon fuel. Optionally, the water may contain an electrolyte.

The process of the second aspect may comprise generating hydrogen gas and oxygen gas in an electrolytic process from water to produce a gas stream containing hydrogen gas and optionally oxygen gas, and
contacting the gas stream with the hydrocarbon fuel such that at least some of the hydrogen gas is introduced into the hydrocarbon fuel to produce an enriched hydrocarbon fuel. Optionally, the water may contain an electrolyte.

In a third aspect, the present invention provides a device for carrying out a process for enriching a hydrocarbon fuel for use in an internal combustion engine, the device adapted to carrying out a process comprising:
(i) contacting a hydrocarbon fuel with hydrogen gas and optionally oxygen gas such that at least some of the hydrogen gas and, if present, oxygen gas is introduced into the hydrocarbon fuel to produce an enriched hydrocarbon fuel. The device may be further adapted such that it can, after step (i): (ii) deliver the enriched hydrocarbon fuel to an internal combustion engine. The contacting of the hydrocarbon fuel with hydrogen gas and optionally oxygen gas may be carried out in an enriching unit as described herein.

In a third aspect, the present invention provides a device for enriching hydrocarbon fuel, the device comprising:
a hydrogen source for producing a gas stream containing hydrogen,
an enriching unit for contacting a hydrocarbon fuel and a gas stream containing hydrogen such that at least some of the hydrogen gas is introduced into the hydrocarbon fuel to produce an enriched hydrocarbon fuel, the hydrogen source being in fluid connection with the enriching unit such that the gas stream containing hydrogen is passed to the enriching unit, the enriching unit having an inlet for the hydrocarbon fuel, and
an outlet for the enriched hydrocarbon fuel.

In a third aspect, the present invention provides a device for enriching hydrocarbon fuel, the device comprising:
a hydrogen production unit for producing a gas stream containing hydrogen,
an enriching unit for contacting a hydrocarbon fuel and a gas stream containing hydrogen such that at least some of the hydrogen gas is introduced into the hydrocarbon fuel to produce an enriched hydrocarbon fuel, the hydrogen production unit being in fluid connection with the enriching unit such that the gas stream containing hydrogen is passed to the enriching unit, the enriching unit having an inlet for the hydrocarbon fuel, and an outlet for the enriched hydrocarbon fuel.

In a fourth aspect, the present invention provides an internal combustion engine having a device of the present invention attached thereto, the device having a conduit for delivery of the enriched hydrocarbon fuel to a fuel and/or air intake of the internal combustion engine.

Optionally, in any of the processes of the first or second aspect, as described herein, the enriched hydrocarbon fuel is delivered to an internal combustion engine.

The processes of the first and second aspects may involve contacting the gas stream containing hydrogen with the hydrocarbon fuel such that at least some of the hydrogen is introduced into the hydrocarbon fuel to produce an enriched hydrocarbon fuel. In the processes of the first and second aspects, the hydrocarbon fuel may be a liquid hydrocarbon fuel, and, in the contacting of the gas stream containing hydrogen with the hydrocarbon fuel such, at least some of the hydrogen is dissolved into the liquid hydrocarbon fuel to produce an enriched liquid hydrocarbon fuel. The liquid hydrocarbon fuel may comprise, for example, petroleum or diesel. The hydrocarbon fuel is described in more detail below. In the present application, if hydrogen and optionally oxygen is/are contacted with and optionally dissolved into the hydrocarbon fuel, preferably there is no change in the chemical structure of the hydrocarbon species within the fuel. For example, preferably, the hydrocarbon species in the hydrocarbon fuel are not chemically reacted with the hydrogen, or, if present, oxygen during the contacting of the hydrogen and optionally oxygen with the hydrocarbon fuel.

The gas stream containing hydrogen preferably contains at least 10% by volume of hydrogen gas, optionally at least 20% by volume, optionally at least 30% by volume, optionally at least 40% by volume, optionally at least 50% by volume, optionally at least 60% by volume hydrogen. In a gas stream produced from the electrolysis of water, the gas stream may comprise about 66% by volume hydrogen.

The gas stream containing hydrogen may further comprise oxygen. The gas stream containing hydrogen may contain at least 10% by volume of oxygen, optionally at least 20% by volume of oxygen, optionally at least 30% by volume of oxygen. In a gas stream produced from the electrolysis of water, the gas stream may comprise about 33% by volume oxygen. The contacting of the gas stream, if it further comprises oxygen, with the hydrocarbon fuel, if it comprises a liquid hydrocarbon fuel, may involve dissolving at least some of the oxygen into the liquid hydrocarbon fuel.

In an embodiment, the present invention provides a process for enriching a hydrocarbon fuel for use in an internal combustion engine, the process comprising:
 (i) contacting a hydrocarbon fuel with a gas stream containing hydrogen gas and oxygen gas such that at least some of the hydrogen gas and oxygen gas is introduced into the hydrocarbon fuel to produce an enriched hydrocarbon fuel. The process may further provide, after step (i):
 (ii) delivering the enriched hydrocarbon fuel to an internal combustion engine.

In the processes described above, e.g. for the first or second aspect, the hydrocarbon fuel may be contacted with the gas stream containing hydrogen such that at least some of the hydrogen gas is introduced into the hydrocarbon fuel to produce an enriched hydrocarbon fuel. Optionally, the hydrocarbon fuel comprises or is a liquid hydrocarbon fuel, and the gas stream containing hydrogen may be passed through the liquid hydrocarbon fuel. Optionally, the hydrocarbon fuel comprises or is a liquid hydrocarbon fuel, and the gas stream containing hydrogen is diffused into the liquid hydrocarbon fuel in the enriching unit. If the hydrocarbon fuel is a liquid hydrocarbon fuel, the passing or diffusing of the gas stream through the liquid hydrocarbon fuel preferably dissolves at least some of the hydrogen into the liquid hydrocarbon fuel. Preferably, the gas stream containing hydrogen is contacted with the hydrocarbon fuel under a pressure of about 1 bar or more, optionally at a pressure of about 1.1 bar or more, optionally at a pressure of about 1.2 bar or more, optionally at a pressure of about 1.3 bar or more, optionally at a pressure of about 1.4 bar or more, optionally at a pressure of about 1.5 bar or more, optionally at a pressure of about 1.7 bar or more, optionally at a pressure of about 2 bar or more, optionally at a pressure of about 3 bar or more, optionally at a pressure of about 4 bar or more, optionally at a pressure of about 5 bar or more, optionally at a pressure of about 6 bar or more, optionally at a pressure of about 8 bar or more, optionally at a pressure of about 10 bar or more, optionally at a pressure of about 15 bar or more, optionally at a pressure of about 20 bar or more, optionally at a pressure of about 25 bar or more, optionally at a pressure of about 30 bar or more. Optionally, in the process of either the first or second aspect, preferably, the gas stream containing hydrogen is contacted with the hydrocarbon fuel under a pressure of from about 1 bar to about 10 bar, optionally about 1 bar to about 8 bar, optionally about 1 bar to about 7 bar, optionally about 1 bar to about 5 bar, optionally about 1.5 bar to about 4 bar. If the hydrocarbon fuel is or comprises a liquid hydrocarbon fuel, and the liquid hydrocarbon fuel is being delivered to an internal combustion engine using a fuel pump operating at a pressure P, with the gas stream containing hydrogen and the liquid hydrocarbon fuel being contacted after the liquid hydrocarbon fuel has left the fuel pump and before it is delivered to the internal combustion engine as an enriched liquid hydrocarbon fuel, the gas stream containing hydrogen is preferably contacted with, e.g. passed through, the liquid hydrocarbon fuel at a pressure of more than P. If the hydrocarbon fuel is or comprises a liquid hydrocarbon fuel, and, following the contacting with the gas stream containing hydrogen gas, the liquid enriched hydrocarbon fuel is passed to an injector pump of an internal combustion engine for injection into a combustion chamber of the engine, the injector pump having a working pressure P', preferably the liquid hydrocarbon fuel is contacted with the gas stream containing hydrogen gas at a pressure less than P'. The device of the third aspect may be adapted such that the gas stream containing hydrogen is contacted with the hydrocarbon fuel at the pressures mentioned above.

Preferably, the gas stream containing hydrogen is passed through the hydrocarbon fuel under a pressure of about 1 bar or more, optionally at a pressure of about 1.1 bar or more, optionally at a pressure of about 1.2 bar or more, optionally at a pressure of about 1.3 bar or more, optionally at a pressure of about 1.4 bar or more, optionally at a pressure of about 1.5 bar or more, optionally at a pressure of about 1.7 bar or more, optionally at a pressure of about 2 bar or more, optionally at a pressure of about 3 bar or more, optionally at a pressure of about 4 bar or more, optionally at a pressure of about 5 bar or more, optionally at a pressure of about 6 bar or more, optionally at a pressure of about 8 bar or more, optionally at a pressure of about 10 bar or more, optionally at a pressure of about 15 bar or more, optionally at a pressure of about 20 bar or more, optionally at a pressure of about 25 bar or more, optionally at a pressure of about 30 bar or more. Optionally, in the process of either the first or second aspect, preferably, the gas stream containing hydrogen is passed through the hydrocarbon fuel under a pressure of from about 1 bar to about 10 bar, optionally about 1 bar to about 8 bar, optionally about 1 bar to about 7 bar, optionally about 1 bar to about 5 bar, optionally about 1.5 bar to about 4 bar. If the hydrocarbon fuel is or comprises a liquid hydrocarbon fuel, and the liquid hydrocarbon fuel is being delivered to an internal combustion engine using a fuel pump operating at a pressure P, with the gas stream containing hydrogen and the liquid hydrocarbon fuel being contacted after the liquid hydrocarbon fuel has left the fuel pump and before it is delivered to the internal combustion engine as an enriched liquid hydrocarbon fuel, the gas stream containing hydrogen is preferably passed through the liquid hydrocarbon fuel at a pressure of more than P. If the hydrocarbon fuel is or comprises a liquid hydrocarbon fuel, and, following the contacting with the gas stream containing hydrogen gas, the liquid enriched hydrocarbon fuel is passed to an injector pump of an internal combustion engine for injection into a combustion chamber of the engine, the injector pump having a working pressure P', preferably the gas stream containing hydrogen gas is passed through the liquid hydrocarbon fuel at a pressure less than P'. The device of the third aspect, may be adapted such that the gas stream containing hydrogen is passed through the hydrocarbon fuel at the pressures mentioned above.

In an embodiment, the present invention provides a process for enriching a hydrocarbon fuel for use in an internal combustion engine, the process comprising:
(i) contacting a liquid hydrocarbon fuel with a gas stream containing hydrogen gas and oxygen gas such that at least some of the hydrogen gas and oxygen gas is introduced into, e.g. dissolved into, the hydrocarbon fuel to produce an enriched hydrocarbon fuel. The process may further provide, after step (i):
(ii) delivering the enriched hydrocarbon fuel to an internal combustion engine. Preferably, the gas stream containing hydrogen gas and oxygen gas is contacted with the hydrocarbon fuel under a pressure of about 1 bar or more, optionally at a pressure of about 1.1 bar or more, optionally at a pressure of about 1.2 bar or more, optionally at a pressure of about 1.3 bar or more, optionally at a pressure of about 1.4 bar or more, optionally at a pressure of about 1.5 bar or more, optionally at a pressure of about 1.7 bar or more, optionally at a pressure of about 2 bar or more, optionally at a pressure of about 3 bar or more, optionally at a pressure of about 4 bar or more, optionally at a pressure of about 5 bar or more, optionally at a pressure of about 6 bar or more, optionally at a pressure of about 8 bar or more, optionally at a pressure of about 10 bar or more, optionally at a pressure of about 15 bar or more, optionally at a pressure of about 20 bar or more, optionally at a pressure of about 25 bar or more, optionally at a pressure of about 30 bar or more. Optionally, in the process of either the first or second aspect, preferably, the gas stream containing hydrogen gas and oxygen gas is contacted with the hydrocarbon fuel under a pressure of from about 1 bar to about 10 bar, optionally about 1 bar to about 8 bar, optionally about 1 bar to about 7 bar, optionally about 1 bar to about 5 bar, optionally about 1.5 bar to about 4 bar. If the hydrocarbon fuel is or comprises a liquid hydrocarbon fuel, and the liquid hydrocarbon fuel is being delivered to an internal combustion engine using a fuel pump operating at a pressure P, with the gas stream containing hydrogen gas and oxygen gas and the liquid hydrocarbon fuel being contacted after the liquid hydrocarbon fuel has left the fuel pump and before it is delivered to the internal combustion engine as an enriched liquid hydrocarbon fuel, the gas stream containing hydrogen gas and oxygen gas is preferably contacted with the liquid hydrocarbon fuel at a pressure of more than P. If the hydrocarbon fuel is or comprises a liquid hydrocarbon fuel, and, following the contacting with the gas stream containing hydrogen gas and oxygen gas, the liquid enriched hydrocarbon fuel is passed to an injector pump of an internal combustion engine for injection into a combustion chamber of the engine, the injector pump having a working pressure P', preferably the liquid hydrocarbon fuel is contacted with the gas stream containing hydrogen gas and oxygen gas at a pressure less than P'. The device of the third aspect, may be adapted such that it produces the gas stream containing hydrogen and oxygen, the gas stream containing hydrogen and oxygen being contacted with the hydrocarbon fuel at the pressures mentioned above.

Preferably, the gas stream containing hydrogen gas and oxygen gas is passed through the hydrocarbon fuel under a pressure of about 1 bar or more, optionally at a pressure of about 1.1 bar or more, optionally at a pressure of about 1.2 bar or more, optionally at a pressure of about 1.3 bar or more, optionally at a pressure of about 1.4 bar or more, optionally at a pressure of about 1.5 bar or more, optionally at a pressure of about 1.7 bar or more, optionally at a pressure of about 2 bar or more, optionally at a pressure of about 3 bar or more, optionally at a pressure of about 4 bar or more, optionally at a pressure of about 5 bar or more, optionally at a pressure of about 6 bar or more, optionally at a pressure of about 8 bar or more, optionally at a pressure of about 10 bar or more, optionally at a pressure of about 15 bar or more, optionally at a pressure of about 20 bar or more, optionally at a pressure of about 25 bar or more, optionally at a pressure of about 30 bar or more. Optionally, in the process of either the first or second aspect, preferably, the gas stream containing hydrogen gas and oxygen gas is passed through the hydrocarbon fuel under a pressure of from about 1 bar to about 10 bar, optionally about 1 bar to about 8 bar, optionally about 1 bar to about 7 bar, optionally about 1 bar to about 5 bar, optionally about 1.5 bar to about 4 bar. If the hydrocarbon fuel is or comprises a liquid hydrocarbon fuel, and the liquid hydrocarbon fuel is being delivered to an internal combustion engine using a fuel pump operating at a pressure P, with the gas stream containing hydrogen gas and oxygen gas and the liquid hydrocarbon fuel being contacted after the liquid hydrocarbon fuel has left the fuel pump and before it is delivered to the internal combustion engine as an enriched liquid hydrocarbon fuel, the gas stream containing hydrogen gas and oxygen gas is preferably passed through the liquid hydrocarbon fuel at a pressure of more than P. If the hydrocarbon fuel is or comprises a liquid hydrocarbon fuel, and, following the contacting with the gas stream containing hydrogen gas and oxygen gas, the liquid enriched hydrocarbon fuel is passed to an injector pump of an internal combustion engine for injection into a combustion chamber of the engine, the injector pump having a working pressure P', preferably the gas stream containing hydrogen gas and oxygen gas is passed through the liquid hydrocarbon fuel at a pressure less than P'. The device of the third aspect, may be adapted such that it produces a gas stream containing hydrogen gas and oxygen gas, the gas stream containing hydrogen and oxygen being passed through the hydrocarbon fuel at the pressures mentioned above.

In an embodiment, the enriched hydrocarbon fuel is delivered to an internal combustion engine. The enriched hydrocarbon fuel may be delivered to the internal combustion engine at a suitable volumetric rate (typically measured in L/min), which will depend on the type of the engine and the mechanical equipment to which it may be attached, such as a vehicle. This may, for example on some vehicles, be in the region of 0.05 L/min to 1 L/min, optionally in the region of 0.1 L/min to 0.5 L/min.

The contacting of the gas stream containing hydrogen and the hydrocarbon fuel may be carried out at ambient temperature, for example a temperature of at or above −10° C., optionally from −10° C. to 30° C. Optionally, the contacting of the gas stream and the hydrocarbon fuel may be carried out in the fuel enrichment unit at a temperature above the ambient temperature outside of the fuel enrichment unit. Optionally, the contacting of the gas stream and the hydrocarbon fuel may be carried out in the fuel enrichment unit at a temperature at or above 30° C., optionally above 40° C., optionally above 50° C.

The gas stream containing hydrogen may be contacted with the hydrocarbon fuel at a suitable rate such that such that at least some of the hydrogen gas is introduced into the hydrocarbon fuel to produce an enriched hydrocarbon fuel. The gas stream containing hydrogen may be passed through the hydrocarbon fuel, optionally diffused through the hydrocarbon fuel, to produced the enriched hydrocarbon fuel, which is then passed to an internal combustion engine. In a preferred embodiment, the ratio of 'volumetric rate of delivery of the enriched hydrocarbon fuel to the internal combustion engine (in L/min):volumetric rate of hydrogen in the gas stream containing hydrogen contacted or passed through the hydrocarbon fuel to produce the enriched hydrocarbon fuel (in L/min)' is 10:1 to 1:50, preferably 1:1 to 1:15, more preferably 1:4 to 1:12.

In a preferred embodiment, the ratio of 'volumetric rate of delivery of the enriched hydrocarbon fuel to the internal combustion engine (in L/min):volumetric rate of total volume of gas stream containing hydrogen contacted or passed through the hydrocarbon fuel to produce the enriched hydrocarbon fuel (in L/min)' is 20:3 to 1:75, preferably 3:2 to 1:22.5, more preferably 1:6 to 1:18.

Optionally, in the process of either the first or second aspect, the enriched hydrocarbon fuel is maintained at pressure of about 1 bar or more, optionally at a pressure of about 1.1 bar or more, optionally at a pressure of about 1.2 bar or more, optionally at a pressure of about 1.3 bar or more, optionally at a pressure of about 1.4 bar or more, optionally at a pressure of about 1.5 bar or more, optionally at a pressure of about 1.7 bar or more, optionally at a pressure of about 2 bar or more, optionally at a pressure of about 3 bar or more, optionally at a pressure of about 4 bar or more, optionally at a pressure of about 5 bar or more, optionally at a pressure of about 6 bar or more, optionally at a pressure of about 8 bar or more, optionally at a pressure of about 10 bar or more, optionally at a pressure of about 15 bar or more, optionally at a pressure of about 20 bar or more, optionally at a pressure of about 25 bar or more, optionally at a pressure of about 30 bar or more, until it is delivered to an internal combustion engine. If the hydrocarbon fuel is or comprises a liquid hydrocarbon fuel, and the liquid hydrocarbon fuel is being delivered to an internal combustion engine using a fuel pump operating at a pressure P, with the gas stream containing hydrogen and the liquid hydrocarbon fuel being contacted after the liquid hydrocarbon fuel has left the fuel pump and before it is delivered to the internal combustion engine as an enriched liquid hydrocarbon fuel, the enriched liquid hydrocarbon fuel is maintained at a pressure of more than P until it is delivered to the internal combustion engine.

The enriching unit may comprise a device (otherwise termed herein an enrichment device) for diffusing gas into a liquid, comprising:

a first gas chamber portion having a gas inlet for introducing gas into the first gas chamber portion;

a liquid chamber portion having a liquid inlet for introducing liquid into the liquid chamber portion and a liquid outlet, wherein the first gas chamber portion and the liquid chamber portion are in fluid communication with each other; and means for pressurising the first gas chamber portion, wherein when the first gas chamber portion is pressurised, the gas in the first gas chamber portion is diffused into the liquid in the liquid chamber portion.

The means for pressurising the first gas chamber portion may be any means that can reduce the volume within which the gas in the first gas chamber portion is contained or increase the amount of gas within the first gas chamber or a combination thereof. The means for pressurising the first gas chamber portion may comprise a piston slidably displaceable within the first gas chamber portion.

Preferably, the piston is arranged to be driven by any suitable means, including, but not limited to, an electrical means for example a solenoid, pneumatic means for example compressed gas, or a screw pump. The piston can be driven a desired number of cycles per minute, typically about 10 to about 30, and preferably about 15 to about 25, most preferably at about 20 cycles per minute.

Preferably, the gas inlet in the first gas chamber portion is provided with a gas inlet valve which is arranged to control the supply of gas to the first gas chamber portion.

Preferably, the gas inlet valve is a solenoid valve.

Optionally, the first gas chamber portion is provided with a pressure relief valve.

The enrichment device may further comprise a non-return valve disposed between the first gas chamber portion and the liquid chamber portion that allows fluid flow from the first gas chamber portion to the liquid chamber portion.

The enrichment device may further comprise a diffuser screen disposed within the liquid chamber portion, wherein, in use, the gas passes through the diffuser screen so as to promote uniform diffusion of the gas into the liquid. Optionally, the liquid chamber portion and the first gas chamber portion are separated from each other by a partition provided with a fluid passageway, wherein the diffuser screen is resiliently biased towards the partition such that when the gas in the first gas chamber portion is pressurised the diffuser screen moves away from the partition allowing the pressurised gas to flow to a region of the liquid chamber portion between the partition and the diffuser screen and through the diffuser screen into the liquid in the liquid chamber portion.

Optionally, the liquid inlet is provided with a non-return valve that allows fluid flow into the liquid chamber.

The enrichment device may further comprise a second gas chamber portion that is in fluid communication with the liquid chamber portion through a semi-permeable membrane, the second gas chamber portion having a gas outlet, wherein in use gas can flow from the liquid chamber portion through the semi-permeable membrane into the second gas chamber portion and exit the device through the gas outlet. The semi-permeable membrane, may be selective for either hydrogen (over hydrocarbons) or hydrocarbons (over hydrogen), to produce, in use, a permeate enriched, respectively, in hydrogen or hydrocarbons, with the retentate being enriched, respectively, in hydrocarbons or hydrogen. Such semi-permeable membranes are described below.

Optionally, the gas outlet is provided with a gas outlet valve, which is optionally a solenoid valve.

The enrichment device may further comprise an intermediate chamber portion situated between the liquid chamber portion and the second gas chamber portion, the intermediate chamber portion being separated from the liquid chamber portion by a baffle plate and from the second gas chamber portion by the semi-permeable membrane.

The liquid inlet in the first gas chamber portion may be in fluid connection with a source of hydrocarbon fuel, optionally a source of liquid hydrocarbon fuel. The gas inlet of the first gas chamber portion may be in fluid connection with a hydrogen source and/or an oxygen source. The gas inlet of the first gas chamber portion may be in fluid connection with a hydrogen production unit and/or an oxygen production unit.

Optionally, in a vehicle comprising the enrichment device, an internal combustion engine having one or more fuel injector pumps, a fuel tank, the liquid inlet of the enrichment device is in fluid communication with the vehicle fuel tank, the gas inlet is in fluid communication with a hydrogen source or a hydrogen production unit, which may be as described herein, and the liquid outlet is in fluid communication with the one or more fuel injector pumps of the internal combustion engine.

Optionally, in using the enriching unit, the liquid is a liquid hydrocarbon fuel and the gas diffused into the liquid in the liquid chamber portion is a gas stream containing hydrogen and optionally oxygen, and the pressure in the liquid chamber portion is a pressure for contacting the hydrocarbon fuel with the gas stream containing hydrogen, as described herein.

Optionally, in the process of either the first or second aspect, the enriched hydrocarbon fuel is heated to a temperature of about 50° C. or more. The enriched hydrocarbon fuel may be heated to a temperature of about 50 or more.

Optionally, in the process of either the first or second aspect, the enriched hydrocarbon fuel is heated to a temperature of about 50° C. or more, and then passed to an internal combustion engine.

Optionally, in the process of either the first or second aspect, the enriched hydrocarbon fuel is placed in a magnetic field, and then delivered to an internal combustion engine. Optionally, in the process of either the first or second aspect, the enriched hydrocarbon fuel is heated to a temperature of about 50° C. or more and placed in a magnetic field, and then delivered to an internal combustion engine. The magnetic field may be generated by any suitable magnet or magnets. The magnet or magnets may be permanent or electromagnets. Preferably, the magnetic field produced by the magnet or magnets is an oscillating magnetic field. The maximum strength of the oscillating magnetic field may be at least 0.5 T, optionally, at least 1 T, optionally at least 2 T. The field may oscillate with a frequency of at least 1 Hz, optionally at least 10 Hz, optionally at least 100 Hz, optionally at least 1000 Hz, optionally at least 10 MHz, optionally at least 100 MHz, optionally at least 300 MHz, optionally at least 500 MHz. Optionally, the magnetic field may be a produced by superheterodyne magnets. Such magnets are known to the skilled person.

Optionally, in the process of either the first or second aspect, the process comprises:

generating hydrogen gas and oxygen gas in an electrolytic process from water in a first electrolytic cell, and producing a first gas stream containing hydrogen and optionally oxygen, generating hydrogen gas and oxygen gas in an electrolytic process from water in a second electrolytic cell, and producing a second gas stream containing oxygen and optionally hydrogen contacting the first gas stream with the hydrocarbon fuel such that at least some of the hydrogen gas is introduced into the hydrocarbon fuel to produce an enriched hydrocarbon fuel, and optionally delivering the enriched hydrocarbon fuel to an internal combustion engine, and optionally delivering the second gas stream to the internal combustion engine, the second gas stream contacting the enriched hydrocarbon fuel in the internal combustion engine. Optionally, at least some of the hydrogen gas from the second cell is contacted with the hydrocarbon fuel, such that at least some of the hydrogen gas is introduced into the hydrocarbon fuel to produce the enriched hydrocarbon fuel. Optionally, the water in the first and/or second electrolytic cell comprises an electrolyte, which may be as described herein.

Optionally, in the process of either the first or second aspect, the contacting of the gas stream containing hydrogen gas with the hydrocarbon fuel produces the enriched hydrocarbon fuel and a gaseous mixture, the process further comprising separating the enriched hydrocarbon fuel and the gaseous mixture, optionally delivering the enriched hydrocarbon fuel to the internal combustion engine, optionally at a fuel inlet, and optionally delivering the gaseous mixture to the internal combustion engine, optionally at an air inlet. The separating of the enriched hydrocarbon fuel and the gaseous mixture may be effected by any suitable means. Preferably, the enriched hydrocarbon fuel and gaseous mixture are contacted with a semi-permeable membrane, which is selective for either hydrogen (over hydrocarbons) or hydrocarbons (over hydrogen), to produce a permeate enriched, respectively, in hydrogen or hydrocarbons, with the retentate being enriched, respectively, in hydrocarbons or hydrogen. Such semi-permeable membranes are known to the skilled person. The present inventors have found that it is preferable for the enriched hydrocarbon fuel and gaseous mixture are contacted with a semi-permeable membrane, which is selective for either hydrogen (over hydrocarbons). The membrane may, for example, comprise a glassy membrane, such as polyetherimide, which is generally selective for small molecules, such as hydrogen, over hydrocarbons. Such semi-permeable membranes are preferably selected from materials including polyimides, polysulfones, and polyethylene or polypropylene. The membrane may be a membrane as described in WO 2004/039874. The membrane may be a mixed matrix membrane. The membrane is preferably a porous membrane having pores with a size of at least 10 microns, optionally at least 100 microns. The membrane is preferably a porous sintered polyethylene or polypropylene membrane having pores having a pore size of 10 to 100 microns, optionally having a thickness of from 0.75 to 10 mm. Such membranes are available under the tradename i-Vyon and are produced by Porvair Filtration Group.

Optionally, in the process of either the first or second aspect, the enriched hydrocarbon fuel is passed to an internal combustion engine, the internal combustion engine is running and unused hydrocarbon fuel from the internal combustion engine is circulated such that, after it has left the internal combustion engine, it is contacted with the gas stream containing hydrogen such that at least some of the hydrogen gas is introduced into the hydrocarbon fuel to produce an enriched hydrocarbon fuel, and then passed back to the internal combustion engine.

Optionally, the process is controlled by an electronic fuel injection enhancement device (an EFIE device). Such devices are known to those skilled in the art. Such devices are typically adapted such that, when attached to the wiring connecting an oxygen sensor of a vehicle to the vehicle's computer, an offset to the voltage coming from the oxygen sensor is applied. This effectively informs the vehicle's computer that the oxygen content within the engine is at a normal level, and avoids the vehicle, for example, pumping more fuel into the engine when this would not be desirable. The EFIE devices can optionally control one or more other processes in or related to an internal combustion engine, including, but not limited to, launch control, boost, water injection, nitrous injection, fuel injection devices, drive manifold components such as manifold flaps, solenoids within the engine and associated devices e.g. cam solenoids.

Optionally, the process is controlled by a two-dimensional (sometimes termed a two-map) electronic fuel injection enhancement device, optionally a three-dimensional electronic (or three-map) fuel injection enhancement device, optionally a four-dimensional (or four-map) electronic fuel injection enhancement device, preferably a five dimensional (or five-map) electronic fuel injection enhancement device.

In a third aspect, the present invention provides a device for enriching hydrocarbon fuel, the device comprising:
a hydrogen source for producing a gas stream containing hydrogen,
an enriching unit for contacting a hydrocarbon fuel and a gas stream containing hydrogen such that at least some of the hydrogen gas is introduced into the hydrocarbon fuel to produce an enriched hydrocarbon fuel, the hydrogen source being in fluid connection with the enriching unit such that the gas stream containing hydrogen is passed to the enriching unit, the enriching unit having an inlet for the hydrocarbon fuel, and
an outlet for the enriched hydrocarbon fuel.

The device may be used for carrying out the process of the first aspect, the process further comprising providing hydrogen from the hydrogen source, and then, in step (i) contacting the hydrogen gas with the hydrocarbon fuel in the enriching unit.

As mentioned above, the present invention provides, in a third aspect, a device for enriching hydrocarbon fuel, the device comprising:
a hydrogen production unit for producing a gas stream containing hydrogen,
an enriching unit for contacting a hydrocarbon fuel and a gas stream containing hydrogen such that at least some of the hydrogen gas is introduced into the hydrocarbon fuel to produce an enriched hydrocarbon fuel, the hydrogen production unit being in fluid connection with the enriching unit such that the gas stream containing hydrogen is passed to the enriching unit, the enriching unit having an inlet for the hydrocarbon fuel, and
an outlet for the enriched hydrocarbon fuel.

The device may be used for carrying out the process of the first aspect, the process further comprising producing hydrogen in the hydrogen production unit, and then, in step (i) contacting the hydrogen gas with the hydrocarbon fuel in the enriching unit.

In a third aspect, the present invention provides a device for enriching hydrocarbon fuel, the device comprising:
a hydrogen source and an oxygen source for producing a gas stream containing hydrogen gas and oxygen gas
an enriching unit for contacting a hydrocarbon fuel and a gas stream containing hydrogen gas and oxygen gas such that at least some of the hydrogen gas and oxygen gas is introduced into the hydrocarbon fuel to produce an enriched hydrocarbon fuel, the hydrogen production unit being in fluid connection with the enriching unit such that the gas stream containing hydrogen gas and oxygen gas is passed to the enriching unit, the enriching unit having an inlet for the hydrocarbon fuel, and
an outlet for the enriched hydrocarbon fuel.

The device may be used for carrying out the process of the first aspect, the process further comprising providing hydrogen from the hydrogen source and oxygen from the oxygen source, and then, in step (i) contacting the hydrogen gas and oxygen gas with the hydrocarbon fuel in the enriching unit.

As mentioned above, the present invention provides, in a third aspect, a device for enriching hydrocarbon fuel, the device comprising:
a hydrogen production unit and an oxygen production unit for producing a gas stream containing hydrogen gas and oxygen gas,
an enriching unit for contacting a hydrocarbon fuel and a gas stream containing hydrogen gas and oxygen gas such that at least some of the hydrogen gas and oxygen gas is introduced into the hydrocarbon fuel to produce an enriched hydrocarbon fuel, the hydrogen production unit being in fluid connection with the enriching unit such that the gas stream containing hydrogen gas and oxygen gas is passed to the enriching unit, the enriching unit having an inlet for the hydrocarbon fuel, and
an outlet for the enriched hydrocarbon fuel.

The device may be used for carrying out the process of the first aspect, the process further comprising producing hydrogen in the hydrogen production unit and oxygen in the oxygen production unit, and then, in step (i) contacting the hydrogen gas and oxygen gas with the hydrocarbon fuel in the enriching unit.

The hydrogen source or hydrogen production unit may be any suitable unit for supplying hydrogen gas to the enriching unit. The hydrogen source or hydrogen production unit may be a unit that can store hydrogen and supply hydrogen gas as required to the enriching unit. A unit that can store hydrogen may store the hydrogen in gaseous, liquid or chemically bound form, and release it as required.

Units for storing hydrogen in its gaseous form are known to the skilled person and may comprise a chamber, typically a cylinder, containing hydrogen under pressure that can be released upon opening a valve. The unit for storing hydrogen may be a unit typically termed a hydrogen tank (otherwise known as a hydrogen cartridge or canister), which can store hydrogen under pressure, such as pressures from about 150 bar or more, optionally from about 300 bar or more, optionally from about 500 bar or more.

Units for storing hydrogen in its liquid state are known to the skilled person. Such units typically store the hydrogen under pressure and at very low temperatures, e.g. a temperature of about 20.28 K.

The unit for storing hydrogen may be a unit that stores hydrogen in a chemically bound form. Such units can include materials that bind to hydrogen, and release it when desired, typically by heating the materials. Such materials are known to the skilled person. The unit may include a material such as a metal hydride, where the metal may be selected from an alkali metal, alkali earth metal and a transition metal; a metal organic framework; carbon nanotubes; and imidazolium ionic liquids. Other materials known to the skilled person may be used. Such materials for hydrogen storage are described in the art.

The oxygen source or oxygen production unit may be any suitable unit for supplying oxygen gas to the enriching unit. The oxygen source or oxygen production unit may be a unit that can store oxygen and supply oxygen gas as required to the enriching unit. A unit that can store oxygen may store the oxygen in gaseous, liquid or chemically bound form, and release it as required.

Units for storing oxygen in its gaseous form are known to the skilled person and may comprise a chamber, typically a cylinder, containing oxygen under pressure that can be released upon opening a valve. The unit for storing oxygen may be a unit typically termed a oxygen tank (otherwise known as a oxygen cartridge or canister), which can store oxygen under pressure, such as pressures from about 150 bar or more, optionally from about 300 bar or more, optionally from about 500 bar or more. Typically, oxygen is stored at a pressure of 200 bar or less.

Units for storing oxygen in its liquid state are known to the skilled person. Such units typically store the oxygen under pressure, typically up to pressures of 200 bar, and at very low temperatures, e.g. a temperature of about 90.19 K or less.

Preferably the hydrogen source or production unit is a unit that can produce hydrogen from one or more chemical substances. The hydrogen may be produced, in a method selected from a steam reforming process from hydrocarbon fuels, for example methane, reforming of an alkanol, such as methanol, and an electrolysis from a suitable medium, for example water. The hydrogen source or hydrogen production unit is preferably one that can produce hydrogen from one or more chemical substances, since the hydrogen gas can be produced when required, which avoids the need to have to store large volumes of hydrogen gas or having to store it in its liquid form, which requires high pressure and low temperatures.

Preferably the oxygen source or production unit is a unit that can produce oxygen from one or more chemical substances. The oxygen may be produced, for example, in an electrolytic process from a suitable medium, such as water. In an embodiment, the oxygen may be produced in a chemical oxygen generator. A chemical oxygen generator is a generator of oxygen from a chemical reaction, typically without any requirement for electrolysis. For example, a chemical oxygen generator may produce oxygen by reaction of an oxygen-containing species with another species. The oxygen-containing species may, for example, be selected from a superoxide, a chlorate, a perchlorate and an ozonide. An example commercially available oxygen generator produces oxygen from the reaction of sodium chlorate ($NaClO_3$), barium peroxide ($BaO_2$) and potassium perchlorate ($KClO_4$) with a lead styphnate and tetrazene mixture. A further example of a unit for producing oxygen is a chlorate candle, sometimes termed an oxygen candle, which generates oxygen from a mix of sodium chlorate and iron powder. Most preferably, the oxygen source or oxygen production unit is a unit that comprises one or more cells for the electrolytic production of oxygen.

The hydrogen source and oxygen source may be the same or different sources. The hydrogen production unit and oxygen production unit may be the same or different units.

Most preferably, the hydrogen source or the hydrogen production unit is a unit that comprises one or more cells for the electrolytic production of hydrogen, preferably the electrolytic production of hydrogen and oxygen from a suitable liquid medium. Most preferably, the oxygen source or the oxygen production unit is a unit that comprises one or more cells for the electrolytic production of oxygen, preferably the electrolytic production of hydrogen and oxygen from a suitable liquid medium. The liquid medium may comprise water and optionally one or more electrolytes. The electrolytes may be selected from an organic acid, such as acetic acid; a metal carbonate, where the metal may, for example, be an alkali metal, e.g. potassium or sodium, e.g. in $K_2CO_3$; and a metal hydroxide, where the metal may, metal may, for example, be an alkali metal, e.g. potassium or sodium. The one or more cells for the electrolytic production of hydrogen and oxygen may comprise a means for refilling the cells with water as required.

The electrolytic cell may be any suitable cell for the generation of hydrogen gas. Typical cells include a chamber comprising water, one or more electrodes C that can act as cathodes and one or more electrodes A that can act as anodes, the electrodes being in contact with the water. The cell may include a plurality of electrodes A and a plurality of electrodes C. The electrodes A and C may be in any suitable form, for example in elongated form, such as a cylinder, or in the form of a plate. The electrodes A and C may be arranged as a series of plates in an alternating manner, i.e. wherein, aside from the end plates in the series, each electrode A is disposed between two electrodes C, and each electrode C being disposed between two electrodes A, wherein adjacent electrodes have a non-conductive substrate, e.g. a non-conductive gasket, disposed between them. In a preferred embodiment, a conductive neutral substrate is disposed between an adjacent electrode A and an adjacent electrode C. A conductive neutral substrate is one which, when the cell is in operation, does not have an electric charge applied to it, unlike the electrodes A and C. The conductive neutral substrate preferably contacts the water in the cell. Optionally, if the cell comprises a plurality of electrodes A and a plurality of electrodes C arranged in series in an alternating manner, as described above, a conductive neutral substrate is disposed between each adjacent electrode A and electrode C, and a non-conductive substrate, e.g. a non-conductive gasket, is disposed between each electrode and adjacent conductive neutral substrate. The one or more electrodes A and the one or more electrodes C may be fully or partially submerged in water. Preferably, the electrodes are partially submerged in water. The electrodes A and C may comprise any suitable conducting material. The electrodes may comprise for example a metal. The metal may be selected from, for example, platinum, copper and stainless steel. The stainless steel may, for example, be a 316 or 304 stainless steel.

The electrolytic cell is operated by attaching the one or more electrodes A and one or more electrodes C to an electrical power source, such that the electrodes A act as anodes and the electrodes C act as cathodes. In operation, in a vehicle comprising an alternator, the electrolytic cell is preferably electrically connected to the alternator, such that it can draw power from the alternator and carry out the electrolytic generation of hydrogen and oxygen.

The water in the electrolytic cell may comprise an electrolyte to promote the conductance of the water. The electrolyte may be any suitable ionic species that can dissolve in the water, and allow the cell to produce hydrogen. Such electrolytes are known to the skilled person. The electrolyte may, for example, be an alkali metal hydroxide, optionally selected from sodium or potassium hydroxide.

The process of the first aspect may further comprise (i) producing a gas stream containing hydrogen gas from the hydrogen source or in the hydrogen production unit, and then, passing the gas stream from the hydrogen source or the hydrogen production unit through a purification unit to remove one or more species other than hydrogen gas to produce a purified gas stream containing hydrogen gas, and, in step (ii), contacting the purified gas stream containing hydrogen gas with the hydrocarbon fuel such that at least some of the hydrogen gas is introduced into the hydrocarbon fuel to produce the enriched hydrocarbon fuel. The contacting may be carried out in the enriching unit, as described herein. "Removing one or more species" includes reducing the concentration (e.g. in mass of the one or more species per volume of the gas stream or volume of the one or more species per volume of the gas stream) in the gas stream containing hydrogen. It may reduce the concentration of the one or more species by 50%, optionally by 80%, optionally by 90%, optionally by 95%, where the concentration of the species is mass of the one or more species per volume of the gas stream or volume of the one or more species per volume of the gas stream. Optionally, the one or more species may be removed completely from the gas stream.

The process of the second aspect may further comprise, generating the hydrogen gas and the oxygen gas in the electrolytic process to produce a gas stream containing hydrogen gas and optionally oxygen gas, passing the gas stream through a purification unit to remove one or more species other than hydrogen to produce a purified gas stream, contacting the purified gas stream with the hydrocarbon fuel such that at least some of the hydrogen gas is introduced into the hydrocarbon fuel to produce an enriched hydrocarbon fuel.

The purification unit preferably removes one or more species other than hydrogen. The one or more species other than hydrogen may be removed entirely or in part from the gas stream. Preferably, if the gas stream containing hydrogen comprises oxygen, oxygen is not removed, since this has been found to enhance the combustion process of the enriched hydrocarbon fuel within an internal combustion engine.

The purification unit preferably removes a species from the gas stream that is soluble in water. If the gas stream being purified has been produced in an electrolytic process that uses water containing an electrolyte, the purification unit is preferably adapted to remove the electrolyte species that may be present in the gas stream. The one or more species may be acid or alkaline when dissolved in water.

The purification unit preferably comprises one or more chambers containing a polar liquid medium, the one or more chambers being adapted for passing the gas stream containing hydrogen through the polar liquid medium in the one or more chambers. The polar liquid medium may comprise a polar protic solvent. The polar liquid medium preferably comprises water, most preferably deionised water.

The purification unit preferably comprises one or more desiccation units for removal of water from the gas stream. The desiccation unit may be any known means for the removal of water. The desiccation means may comprise any suitable material that is suitable for the removal of water from a gas. The desiccation unit may comprise a hygroscopic material. The hygroscopic material may include a hygroscopic inorganic salt, including, but not limited to, metal halides and metal hydroxides. The metal may be selected from alkali metals, alkali earth metals and transition metals. The hygroscopic material may be selected from zinc chloride, calcium chloride, potassium hydroxide and sodium hydroxide.

In a preferable embodiment, the one or more desiccation units comprise one or more molecular sieves for the removal of water. The one or more molecular sieves may comprise a zeolite. The zeolite is preferably capable of allowing hydrogen gas to pass through, but remove water from the gas stream passing through the zeolite. The zeolite is preferably selected from zeolite 3A, 4A, 5A and 13X. Most preferably, the zeolite is selected from zeolite 4A and 5A. The one or more molecular sieves may be in particulate form, for example as a powder or pellets. In an embodiment, the one or more desiccation units may comprise a chamber through which the gas stream containing hydrogen gas is passed, the chamber comprising one or more molecular sieves. The one or more molecular sieves may be in particulate form filling, completely or at least partially, the chamber in the desiccation unit. Alternatively, the one or more molecular sieves may be in the form of continuous mass that fills, completely or at least partially, the chamber in the desiccation unit.

In an embodiment, the desiccation unit comprises a first chamber having a first wall, a second wall and one or more third walls, wherein the first and second walls are permeable to hydrogen and water, and the one or more third walls is impermeable to hydrogen and water, and one or more materials for the removal of water from a gas are disposed in the chamber. In use, the gas stream is passed through the first wall, contacts the one or more materials for the removal of water from a gas, and purified gas stream exits the chamber through the second wall. The first and second walls are preferably porous. The first and second walls may comprise a metal. The one or more materials for the removal of water from a gas may be selected from the hygroscopic materials and molecular sieves mentioned above. Preferably, the one or more materials for the removal of water from a gas comprise molecular sieves. The one or more materials for the removal of water from a gas may be in particulate form, and first and second walls may be porous and have pores that are smaller in diameter than the smallest diameter of most of the particles of the one or more materials for the removal of water from a gas. "Most of" includes, but is not limited to, at least 90% by weight, optionally at least 95% by weight, most preferably at least 99% by weight of the particles. At least some of the particles, optionally at least 50% by weight, optionally at least 75% by weight, optionally at least 90% by weight, of the one or more materials for the removal of water may have a minimum diameter of at least 200 µm, optionally at least 500 µm, optionally at least 0.1 mm, optionally at least 1 mm. In an embodiment, one or both of the first and second walls may comprise a sintered metal. The sintered metal may comprise a metal selected from bronze, brass and stainless steel. The sintered metal may comprise pores having maximum diameters of 200 µm or less, optionally, 150 µm or less, optionally, 100 µm or less, optionally 50 µm or less.

The chamber may be of any suitable three dimensional shape, including, but not limited, to cylindrical, cubic and rectangular prism, with the first and second walls preferably being opposed to one another, and the remaining walls constituting the one or more third walls. Preferably, the chamber is the form of a cylinder, with the first and second walls forming the circular end walls and the third wall forming the cylindrical wall joining first and second walls.

The one or more third walls may be made of any suitable material impermeable to hydrogen and water. Such materials are known to the skilled person, and include, but are not limited to, metals such as steel. The one or more third walls are preferably non-porous.

In an embodiment, the desiccation unit comprises a first chamber as described above, and optionally
  (i) a second chamber disposed on the opposite side of the first wall, the second chamber being substantially free of the one or more materials for the removal of water from a gas; and/or
  (ii) a third chamber disposed on the opposite side of the second wall, the third chamber being substantially free of the one or more materials for the removal of water from a gas. The second chamber may comprise one or more inlets for allowing the gas stream containing hydrogen to enter the second chamber. The third chamber may comprise one or more outlets for allowing the gas stream containing hydrogen to exit the third chamber. The second chamber preferably defines a void that can be filled with the gas stream containing hydrogen, such that the gas stream contacts substantially all of the surface of the first wall, to allow its passage through to the first chamber. "Substantially all of the surface of the first wall" includes, but is not limited, at least 80% of the area of the first wall, optionally at least 90% of the area of the first wall, optionally at least 90% of the area of the first wall.

In a third aspect, the present invention provides a device for enriching hydrocarbon fuel, the device comprising:
  a hydrogen production unit for producing a gas stream containing hydrogen,
  an enriching unit for contacting a hydrocarbon fuel and a gas stream containing hydrogen such that at least some of the hydrogen gas is introduced into the hydrocarbon fuel to produce an enriched hydrocarbon fuel, the hydrogen production unit being in fluid connection with the enriching unit such that the gas stream containing hydrogen is passed to the enriching unit, the enriching unit having an inlet for the hydrocarbon fuel, and
  an outlet for the enriched hydrocarbon fuel.

The enriching unit may further comprise an outlet for gaseous mixtures produced upon contacting the hydrocarbon fuel with the gas stream containing hydrogen.

The device may comprise:
  (i) a first cell for the electrolytic production of hydrogen and oxygen, wherein the first cell is in fluid connection with the enriching unit such that a first gas stream containing hydrogen and optionally oxygen from the first cell is delivered to the enriching unit,
  (ii) a second cell for the electrolytic production of hydrogen and oxygen, wherein the second cell has a conduit for delivery of a second gas stream containing oxygen and optionally hydrogen generated in the second cell to an internal combustion engine, optionally the air intake of the internal combustion engine. In an embodiment, the first cell produces two streams, a first gas stream enriched in hydrogen and a third gas stream enriched in oxygen, wherein the first stream is delivered to the enrichment unit for production of the enriched hydrocarbon fuel, and the third gas stream is passed to the internal combustion engine, optionally an air intake of the internal combustion engine. In an embodiment, the second cell produces two streams, a second gas stream enriched in oxygen and a fourth gas stream enriched in hydrogen, wherein the fourth gas stream is delivered to the enrichment unit for production of the enriched hydrocarbon fuel, and the second gas stream is passed to the internal combustion engine, optionally an air intake of the internal combustion engine. In the present context, if a gas stream is enriched with a particular gas, the gas stream contains at least 50% by volume of the particular gas, optionally at least 60% by volume of the particular gas, at least 70% by volume of the particular gas, at least 80% by volume of the particular gas, at least 90% by volume of the particular gas, at least 95% by volume of the particular gas.

The device may further comprises a heater in fluid connection with an outlet for the enriched hydrocarbon fuel in the enriching unit, the heater optionally capable of heating the hydrocarbon fuel to a temperature of at least 50° C. The heater may comprise a water heating system, which is connectable to the radiator of a vehicle, such that, in use, when connected to a radiator system water from the radiator system can pass through the heater to heat the enriched hydrocarbon fuel.

The device optionally further comprises a means for subjecting the enriched hydrocarbon fuel to a magnetic field. The means for subjecting the enriched hydrocarbon fuel to a magnetic field may comprise static or electromagnets. In an embodiment, the means for subjecting the enriched hydrocarbon fuel to a magnetic field may comprise superheterodyne magnets.

The device may comprises a conduit for delivery of the enriched hydrocarbon fuel to an internal combustion engine. The conduit may, for example, comprise a tube for delivery of the hydrocarbon fuel to the internal combustion engine. The tube may comprise any material suitable for conveying a hydrocarbon fuel.

The present invention further provides an internal combustion engine having a device of the third aspect attached thereto, the device having a conduit for delivery of the enriched hydrocarbon fuel to a fuel and/or air intake of the internal combustion engine.

The present invention further provides an internal combustion engine having a device of the third aspect attached thereto, wherein the device comprises:
  (i) a first cell for the electrolytic production of hydrogen and oxygen, wherein the first cell is in fluid connection with the enriching unit such that a gas stream containing hydrogen generated in the first cell is delivered to the enriching unit, the enriching unit having an outlet for enriched hydrocarbon fuel that is in fluid connection with a fuel intake of the internal combustion engine;
  (ii) a second cell for the electrolytic production of hydrogen and oxygen, wherein the second cell has a conduit for delivery of hydrogen generated in the second cell to an air intake of the internal combustion engine.

The present invention further provides a vehicle comprising an internal combustion engine have a device of the third aspect attached thereto, as described herein.

The hydrocarbon fuel may comprise a fuel for use in an internal combustion engine. The hydrocarbon fuel may comprise petroleum, for example petroleum spirit, sometimes termed gasoline (in the US) or petrol (in the UK), diesel, liquefied petroleum gas, compressed natural gas, jet fuel, biodiesel and alcohols, such as ethanol.

Gasoline, or petroleum, typically comprises hydrocarbons containing between 4 and 12 carbon atoms per molecule. Gasoline, or petroleum, typically comprises hydrocarbons that are produced in the distillation of crude oil, such hydrocarbons being distilled from the crude oil at a temperature of from about 30° C. to about 200° C. at atmospheric pressure. The gasoline or petroleum used in the process or device of the present invention may have an octane rating, prior to contact with the gas stream containing hydrogen, of at least 50, optionally at least 60, optionally at least 70, optionally at least 80, optionally at least 90. The gasoline or petroleum used in the process or device of the present invention may have an octane rating, prior to contact with the gas stream containing hydrogen, of from 85 to 93.

Diesel typically comprises hydrocarbons containing between 8 and 21 carbon atoms per molecule. Gasoline typically comprises hydrocarbons that are produced in the distillation of crude oil, such hydrocarbons being distilled from the crude oil at a temperature of from about 200° C. and 350° C. at atmospheric pressure.

An internal combustion engine is a term known to the skilled person. It is typically a mechanical device in which a fuel can be combusted in a combustion chamber, such that the expansion of gases in the combustion chamber applies a force to a movable component of an engine, such as a piston.

The internal combustion engine may be selected from a two-stroke engine, a four-stroke engine, a six stroke engine and a Wankel rotary engine. A four stroke engine is an engine in which the movable component of the engine, such as a piston, goes through a cycle having four steps. Such steps are typically (i) the intake of fuel and an oxidising gas into the combustion chamber, (ii) compression of the fuel and oxidising gas, (iii) combustion of the fuel and oxidising gas such that the movable parts within the chamber are moved by the expansion of the gases, and (iv) exhaustion, in which the combustion products are exhausted to the atmosphere.

The internal combustion engine may be a petroleum engine or a diesel engine. A petroleum engine is an engine in which the fuel is ignited in a combustion chamber with an electrical spark. A diesel engine is an engine that is adapted such that the fuel is ignited by the compression of the fuel and heat of the engine, rather than an ignition with an electrical spark.

The internal combustion engine may comprise one or more air inlets (sometimes termed air inlet manifolds), one or more combustion chambers in fluid connection with the air inlets, one or more fuel inlets for introduction of hydrocarbon fuel into the engine. The one or more fuel inlets may comprise one or more fuel injection devices for injecting fuel into the engine. The one or more fuel inlets may introduce the fuel into the one or more combustion chambers or into the one or more air inlets.

In an embodiment, the enriched hydrocarbon fuel may be delivered into the engine through the fuel inlets. In a preferred embodiment, the enriched hydrocarbon fuel is delivered into the engine through one or more fuel injection devices, the fuel injection device optionally delivering the enriched hydrocarbon fuel to the air intake and/or the one or more combustion chambers.

In an embodiment, the enriched hydrocarbon fuel is delivered into the engine through a fuel inlet, optionally as described above, and a gas stream containing hydrogen and oxygen produced in an electrolytic process from water is delivered to the engine through the air inlet. As described above, optionally, the water may contain an electrolyte, which may be as described herein.

An embodiment of the present invention will now be described with reference to the Figures.

Note: Figures in Brackets denote the numbering applied to the system components as detailed in FIG. 1.

FIG. 1 shows a diagrammatic block view of an embodiment of the device of the present invention attached to an internal combustion engine.

Figure 2:
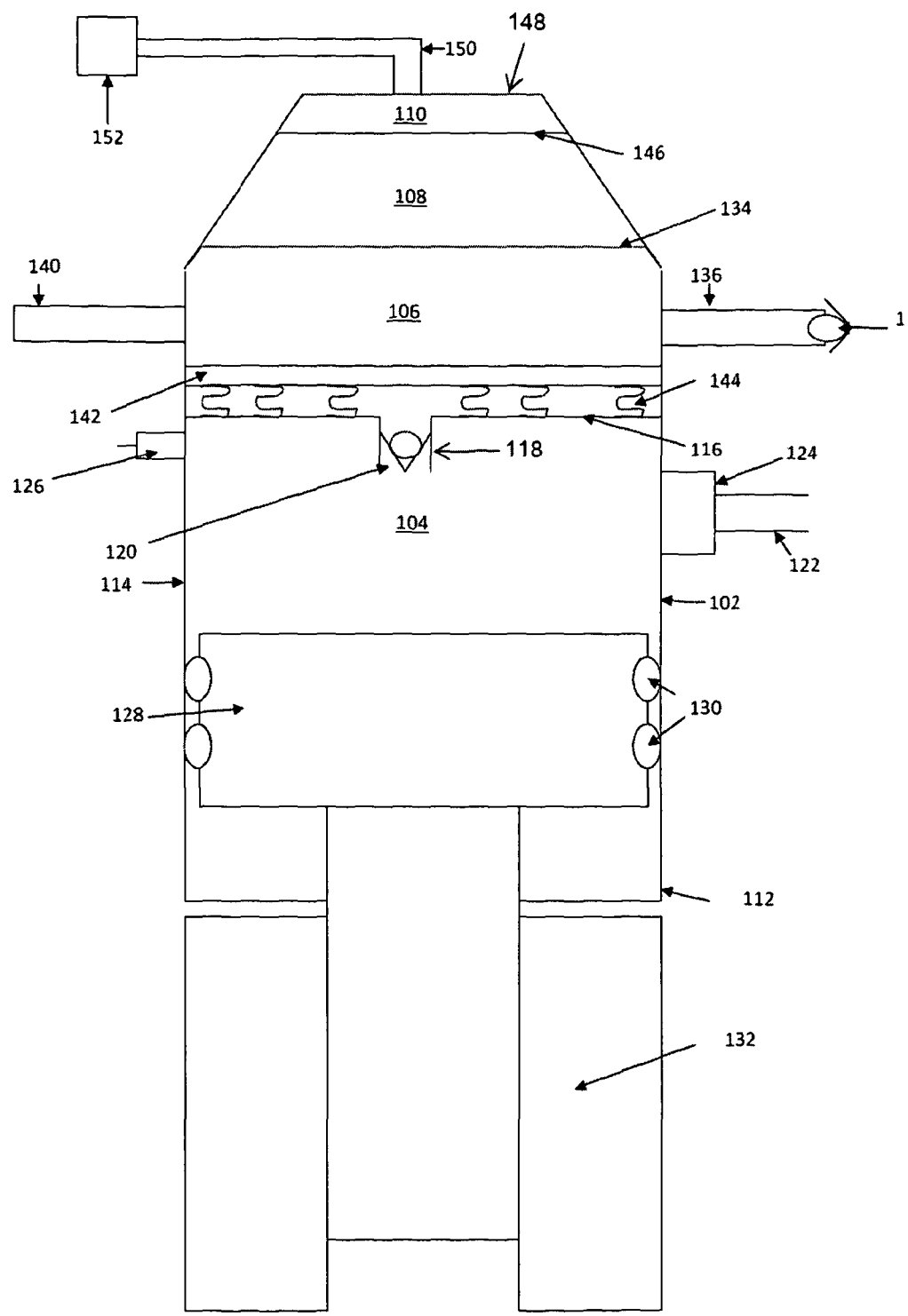
FIG. 2 shows a diagram of an embodiment of the Fuel Enhancement Chamber (an embodiment of the device of the present invention) showing its principle parts.

FIG. 2 shows a diagram of the Fuel Enhancement Chamber showing its principle parts.

The embodiment of FIG. 1 uses two cells (1, 2) for electrolytically producing hydrogen and oxygen from water by utilising existing excess power from the vehicles alternator (23). This does not impinge on the power used to charge the vehicles battery (22). Each cell comprises a plurality of electrodes A, which, in use form the anodes of the cell, and a plurality of electrodes C, which, in use, form the cathodes of the cell. The electrodes A and C are be arranged as a series of plates in an alternating manner, i.e. wherein, aside from the end plates in the series, each electrode A is disposed between two electrodes C, and each electrode C being disposed between two electrodes A. A conductive neutral substrate is disposed between each adjacent electrode A and electrode C, and a non-conductive substrate, e.g. a non-conductive gasket, is disposed between each electrode and adjacent conductive neutral substrate. Such a cell is sometimes terms a dry cell. All electrodes A, C and the neutral conducting substrates contact the water in the cell. The water in the cell partially covers the electrodes A and C and the neutral conducting substrates. Each cell is filled with an aqueous electrolyte solution, typically potassium hydroxide, and is completed by positive and negative terminals. Inlet and outlet tubes from the cell give a feed and return system to a bubbler/reservoir (not shown on diagram) which ensures a constant level of electrolyte within the dry cell and an outlet for the generated gas, i.e. the gas stream containing hydrogen.

Figure 3:
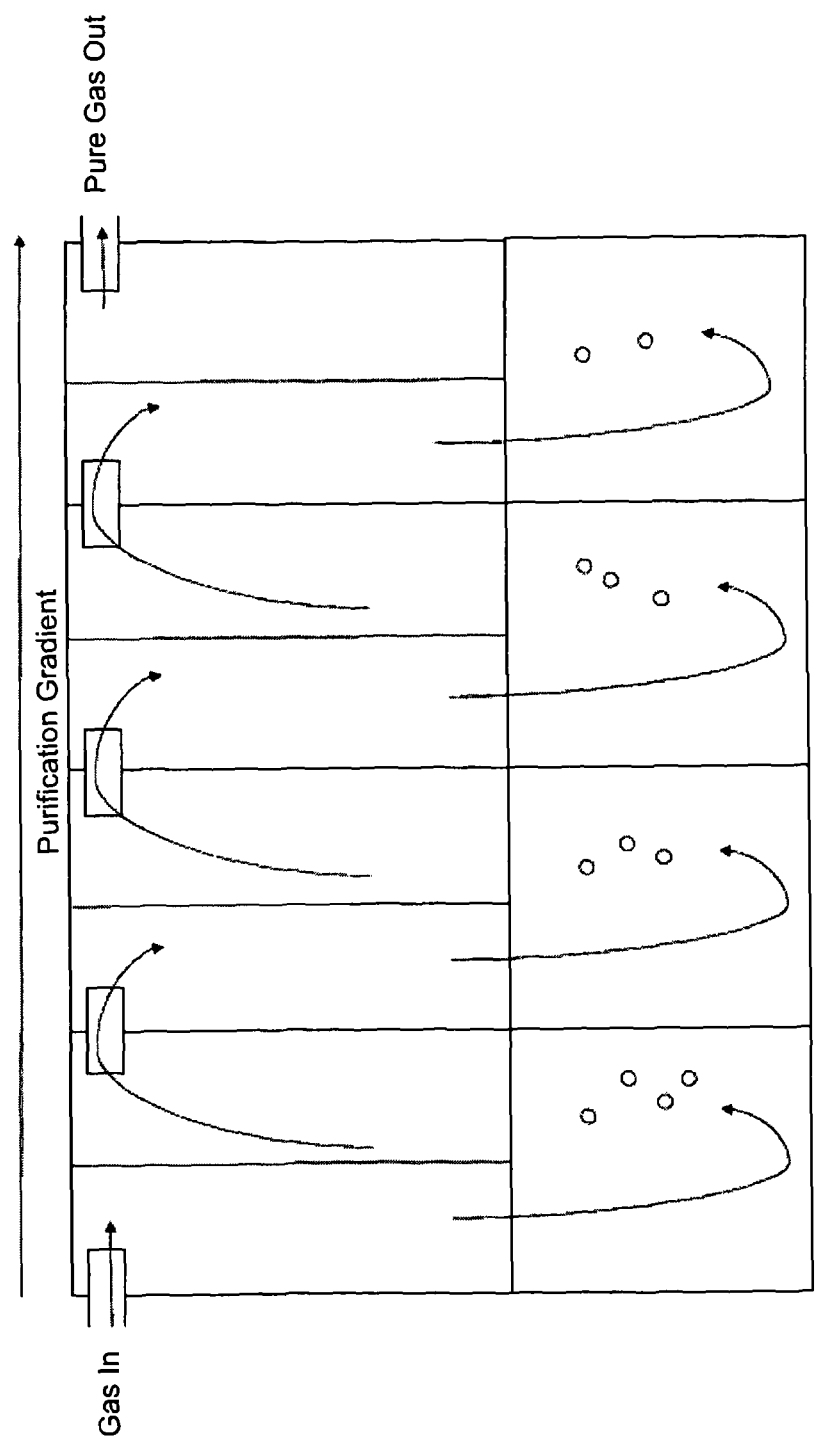
FIG. 3 shows a diagram of a purification unit comprising a gas scrubbing device.

Each of the cells (1, 2) produces a gas stream containing hydrogen which is passed through two purification units in sequence. The first purification unit (3, 10) comprises a plurality of chambers containing deionised water, the one or more chambers being adapted for passing the gas stream containing hydrogen through the water. The first purification unit (3, 10), which may also be termed gas scrubbing devices, is shown in more detail in FIG. 3. All of the walls of the first purification units are fabricated from 316 stainless steel. The gas stream containing hydrogen bubbles through the deionised water in each compartment sequentially, and the caustic species in the gas stream that may be present from the electrolysis process, are dissolved into the water, producing a purified gas stream. This purification step is very important since a certain amount of caustic vapour is carried over from the electrolysis process. This vapour, if not treated, has been found to cause severe problems within aluminium cylinder heads, parts etc.

Figure 4:
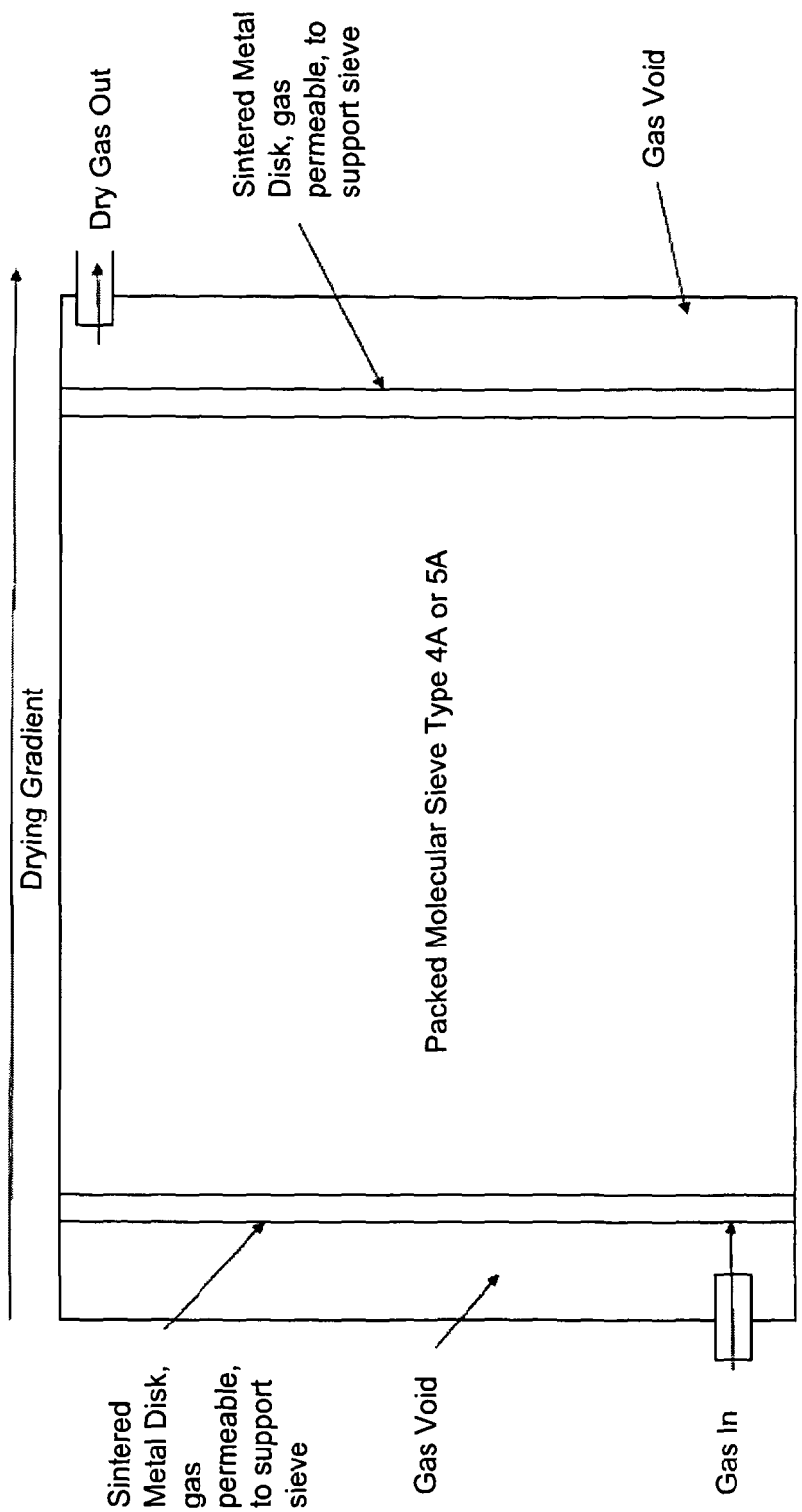
FIG. 4 shows a diagram of a purification unit comprising a molecular sieve drying unit.

The final step in purification of the gas is to pass it through a second purification unit comprising a molecular sieve trap (4, 11) to dry it prior to introduction of the gas into the air intake or the Fuel Enhancement Chamber. A cross section of the molecular sieve trap is shown in FIG. 4. The molecular sieve trap comprises a chamber in the form of a cylinder, having particles of a molecular sieve disposed between two gas permeable circular sintered metal disks. A void is present between the end walls of the cylinder and the two circular sintered metal disks. Each end wall of the cylinder comprises an aperture for allowing a gas stream to pass into or out of the cylinder as appropriate. The drying of the gas stream comprising hydrogen has been found to produce a smoother, less "explosive" combustion when the enriched hydrocarbon fuel is combusted in an internal combustion engine. The molecular sieve traps can be sized dependant on gas flow rates and expected water content and will typically be packed with molecular sieve type 4A or 5A.

The gas stream containing hydrogen that is generated from cell 1 (1), after purification as described, is introduced into the fuel enrichment device (6A; otherwise termed a Fuel Enrichment Chamber in the Figure), FIG. 2 via a Pressure Control Valve (5).

The fuel enrichment device 6A is shown as FIG. 2 and will be described below in more detail. The fuel enrichment device 100 comprises a substantially cylindrical vessel 102 that is divided into a number of chamber portions by dividers or partitions. The vessel 102 is separated into a first gas chamber portion 104, a liquid chamber portion 106, an intermediate chamber portion 108 and a second gas chamber portion 110. Although in this embodiment the chamber portions are sub-divisions of a single vessel, in other embodiments, each chamber portion may be formed from a single vessel with the vessels fluidly interconnected.

The fuel enrichment device 100 can be connected to a vehicle having an internal combustion engine and used to enhance a liquid hydrocarbon fuel, such as petrol or diesel, with hydrogen. In the present embodiment, the device 100 comprises a gas inlet 122 which is connected to the pressure control valve (5, 138), a liquid inlet 136 which is connected to the fuel tank of the vehicle, which may contain petrol or diesel for example, a liquid outlet 140 which is connected to the fuel injector pumps of the engine, and a gas outlet 150 which is connected to the air intake manifold of the engine. The fuel enrichment device 100 is used to dissolve hydrogen gas into the liquid hydrocarbon fuel, thereby enhancing its properties.

The first gas chamber portion 104 is at the bottom of the vessel 102 and is delimited by the base 112 of the vessel, the side walls 114 of the vessel and a partition 116. The partition 116 is substantially parallel to the base 112 and extends across the whole of the cross-section of the vessel 102. The partition 116 is provided with a fluid passageway 118 that is located in the centre of the partition and a non-return valve 120 is disposed in the fluid passageway 118. The non-return valve 120 is set at approximately 1-2 psi (6.89-13.79 kPa). The fluid passageway 118 allows fluid communication between the first gas chamber portion 104 and the liquid chamber portion 106 which is positioned above the partition. The non-return valve 120 allows fluid flow from the first gas chamber portion 104 to the liquid chamber portion 106 when the pressure in the first gas chamber portion 104 exceeds the threshold pressure of the non-return valve 120, but prevents fluid flow in the opposite direction. The first gas chamber portion 104 is also provided with the gas inlet 122 that allows gas from a gas source (e.g. the gas stream containing hydrogen deriving from the first cell) to be introduced into the first gas chamber portion 104. The gas inlet 122 is provided with a solenoid-driven gas inlet valve 124 that controls the supply of gas to the first gas chamber portion 104. The first gas chamber portion 104 also has a pressure relief valve 126 that is set at an appropriate preset value. When the pressure in the first gas chamber portion 104 exceeds the preset value, the pressure relief valve 126 opens and gas is discharged from the first gas chamber portion 104 causing the pressure in the first gas chamber portion 104 to be reduced. This prevents the pressure in the first gas chamber portion 104 from becoming excessively high.

The fuel enrichment device 100 comprises a means for pressurising the gas in the first gas chamber portion 104. In this particular embodiment the means for pressurising the gas in the first gas chamber portion 104 is a piston 128 that is slidably disposed in the first gas chamber portion 104. The piston 128 extends across substantially the whole of the cross section of the first gas chamber portion 104 and can slide in the general axial direction of the vessel 102. The piston 128 is sealed against the inner surface of the side walls 114 of the first gas chamber portion 104 using two O-rings 130 that circumferentially extend around the piston 128. The piston 128 is driven by a solenoid actuator 132 which can move the piston 128 up and down within the first gas chamber portion 104. In FIG. 1, the piston 128 and the solenoid actuator 132 form the solenoid valve 6C, which is driven from a signal in the pressure switch, 6B. The piston 128 can be driven a desired number of cycles per minute by the actuator 132, typically 10 to 30, and preferably about 20 cycles per minute.

When the piston begins its compression stroke the pressure control valve (5) shown in FIG. 1 closes to prevent gas being back pressurised into the gas feed from the molecular sieve trap (4). The non-return valve opens and allows the compressed gas to enter the upper chamber. The sprung gauze is lifted slightly to allow the gas to spread beneath it and allow uniform diffusion through the fuel. The saturation level of the gases in the fuel will be determined by the ratio of volume A to volume B as detailed above.

The liquid chamber portion 106 is positioned above the first gas chamber portion 104 and is delimited by the partition 116, the side walls 114 of the vessel 102 and a baffle plate 134. The baffle plate 134 is substantially parallel to the partition 116 and extends across the entire cross-section of the vessel 102. The baffle plate 134 is provided with a plurality of apertures that provide fluid communication between the liquid chamber portion 106 and the intermediate chamber portion 108. The liquid chamber portion 106 is provided with the liquid inlet 136 that allows liquid fuel to be introduced into the liquid chamber portion 106. A non-return valve 138 is disposed in the liquid inlet 136 and allows flow into the liquid chamber portion 106 but prevents flow out of the liquid chamber portion 106 through the liquid inlet 136. The non-return valve 138 is set at approximately 1-2 psi (6.89-13.79 kPa) below the fuel pump operating pressure of the fuel delivery system of the vehicle. The liquid chamber portion 104 is also provided with the liquid outlet 140. A diffuser screen 142, in the form of a bronze gauze, is disposed towards the bottom of the liquid chamber portion 106. The diffuser screen 142 is substantially parallel to the partition and extends across substantially the entire cross-section of the liquid chamber 106. The diffuser screen 142 is resiliently biased towards to the partition 116 by a plurality of springs 144 connected between the underside of the screen 142 and the upper surface of the partition 116. In a resting state the diffuser screen 142 rests against the upper surface of the partition 116. When the pressure in the first gas chamber portion 104 increases and exceeds the preset value of the non-return valve 120, the valve opens and gas enters the liquid chamber portion 106 through the fluid passageway 118 and this causes the diffuser screen 142 to axially move away (or lift) from the partition 116. This allows the pressurised gas to flow to a region of the liquid chamber portion 106 between the partition 116 and the diffuser screen 142 and through the diffuser screen 142 into the liquid chamber portion 106.

The relative volumes of the first gas chamber portion 104 and the liquid chamber portion 106 can be adjusted depending on the engine type and the level of saturation of the hydrogen into the fuel required. The volumetric ratio of the first gas chamber portion 104 to the liquid chamber portion 106 preferably fulfils the ratio X+0.5:1 where X is the operating pressure of the fuel pump of the vehicle's fuel delivery system in bars.

A semi-permeable membrane 146 is disposed above the baffle plate 134 and extends across the entire cross-section of the vessel 102. The semi-permeable membrane 146 defines a second gas chamber portion 110 between the top 148 of the vessel and the side walls 114 and defines an intermediate chamber portion 108 between the baffle plate 134 and the side walls 114. The second gas chamber portion 110 is provided with a gas outlet 150 that is provided with a solenoid-controlled valve 152. The valve 152 controls the flow of gas out of the second gas chamber portion 110 through the gas outlet 150.

In use, with the piston 128 positioned at the bottom of the first gas chamber portion 104, the first gas chamber portion 104 is filled with a hydrogen/oxygen gas mixture through the gas inlet 122. The flow of gas into the chamber 104 is controlled by the valve 124. Liquid hydrocarbon fuel, such as petrol, from the vehicle's fuel tank fills the liquid chamber portion 106. This is controlled by the vehicle's fuel delivery system. The piston 128 then moves upwards within the first gas chamber portion 104 to compress the hydrogen/oxygen gas. This increases the pressure of the gas which causes it to flow into the liquid chamber portion 106 through the non-return valve 120 in the fluid passageway 118. The pressurised hydrogen/oxygen gas causes the diffuser screen 142 to move away from the partition 116 which allows the pressurised gas to flow to a region between the screen 142 and the partition 116. The pressurised hydrogen/oxygen gas then flows through the diffuser screen 142 and into the liquid hydrocarbon fuel within the liquid chamber portion 106. The diffuser screen 142 helps to promote the uniform diffusion of the hydrogen/oxygen gas into the liquid fuel. The pressure of the hydrogen/oxygen gas causes the hydrogen to diffuse through the fuel and dissolve into it. The hydrogen displaces the nitrogen from the fuel and any excess gas and fuel vapour is forced through the baffle plate 134 into the intermediate chamber portion. The fuel in the liquid chamber 106 is enriched, or enhanced, with hydrogen and is delivered through the liquid outlet to the fuel injector pumps of the vehicle's engine. At least some of the fuel vapour is retained in the intermediate chamber portion by the semi-permeable membrane 146 and any excess gas, such as hydrogen/oxygen/nitrogen, passes through the semi-permeable membrane 146 into the second gas chamber portion 110. This excess gas can then be fed to the air intake manifold of the vehicle's engine through the gas outlet 150. The excess gas may contain fuel vapour which can be fed to the air intake manifold of the engine.

Compressing hydrogen and oxygen into the liquid hydrocarbon fuel provides a number of benefits. Some hydrogen and oxygen is dissolved into the fuel which causes partial saturation of the fuel. This increases the octane rating, or RON, of the fuel. Dissolved impurities within the fuel, such as nitrogen, are forced out of solution by the hydrogen/oxygen and this prevents or reduces the formation of NOx during the combustion process. The partially saturated fuel fed to the fuel injector pumps from the liquid outlet 140 has a reduced viscosity which leads to a much finer misting on passing though the fuel injector system. This gives much better mixing with the enriched air from the air intake manifold and thus results in improved burning characteristics (combustion efficiency).

As the piston 128 moves back down to the bottom of the first gas chamber portion 104 the pressure within the vessel 102 reduces and the diffuser plate 106 returns to a resting position in which it sits on top of, or close to, the partition 116. The cycle then starts again with the first gas chamber portion 104 being filled with hydrogen/oxygen gas and the liquid chamber portion 106 filling with liquid fuel. The diffuser plate may comprise any suitable material, for example a metal or alloy. In a preferred embodiment, the diffuser plate comprises bronze.

Displaced and excess gases from the fuel are passed through the semi-permeable membrane as described above, which may be constructed of Vyon®R (commercially available from Porvair Filtration Group) which retains the majority of any fuel in the excess gas in the upper chamber whilst allowing the hydrogen and oxygen to pass through. This gas exits via a solenoid valve and is introduced into the engine air intake (9) to be burned as part of the combustion process.

The enhanced fuel, containing dissolved hydrogen and oxygen, is fed, via a further non return valve set at Y+2 psi (where Y is the desired operating pressure of the upper chamber in psi) into the magnetic pre-heat chamber (7).

The partially saturated fuel then undergoes a two stage process in the magnetic pre-heat chamber (7) which warms the fuel (thus ensuring at least some of the hydrogen and oxygen gas remain in solution and do not "froth") and magnetic realignment of the fuel molecules using one or more magnets, e.g. as described herein, for example superheterodyne magnets, again known to enhance combustion efficiency. Superheterodyne magnets are known to those skilled in the art and include magnets that produce an oscillating magnetic field. Such magnets have been found to improve the combustion of the hydrocarbon fuel. While not being limited by theory, the present inventors consider that this is due to the interaction of the hydrogen, oxygen and fuel molecules within the oscillating magnetic field, which is believed to produce a closer association of the hydrogen and oxygen with the fuel molecules. The magnetic pre-heat chamber consists of a chamber lined with superheterodyne magnets (to provide the magnetic alignment) and jacketed with warm water from the radiator system, taken off upstream of the radiator thermostat.

This enhanced fuel is fed, via the injector pump (8), into the engine (9) where it is mixed with the air/hydrogen/oxygen mixture from dry cell 2 (2) and the excess gas/fuel from the fuel enhancement chamber (6a). This mixture is considered to be optimised for combustion.

In the engine air intake (9), purified oxygen and hydrogen that originated from dry cell 2 (2) replaces a portion of the air to give an enriched air mixture that enhances the combustion process by displacing nitrogen (for every liter of purified gas introduced into the air intake, 0.79 liters of nitrogen (approx) is displaced) and thus reducing the NOx output, and by increasing the overall energy potential of the fuel mixture. The speed of combustion is also dramatically increased and is proportional to the hydrogen: ratio. Hydrogen on its own burns at between 3-6 cm/min as compared with petrol which burns at a speed of 0.2-0.9 cm/min. The more hydrogen that is present in the combustion mixture, the quicker the mixture will burn to completion.

Any enhanced fuel that is unused in the process is reintroduced into the vehicle fuel tank (13) via the common fuel return (12). This returned fuel is effectively clean of unwanted dissolved gases and has a higher octane rating due to the presence of dissolved hydrogen. Since the fuel has been partially saturated it is expected that some gas will be released into the bulk fuel supply where it will be absorbed. Thus, the longer the vehicle is run (on the same tank of fuel) the more enriched the bulk fuel will become with dissolved hydrogen and oxygen and the better the efficiency will be. To prevent pressurisation of the fuel tank a pressure relief valve (15) is introduced which will allow any build up of gas/fuel pressure to effectively be relieved into the air intake where it can be safely introduced into the engine for combustion.

Figure 5:
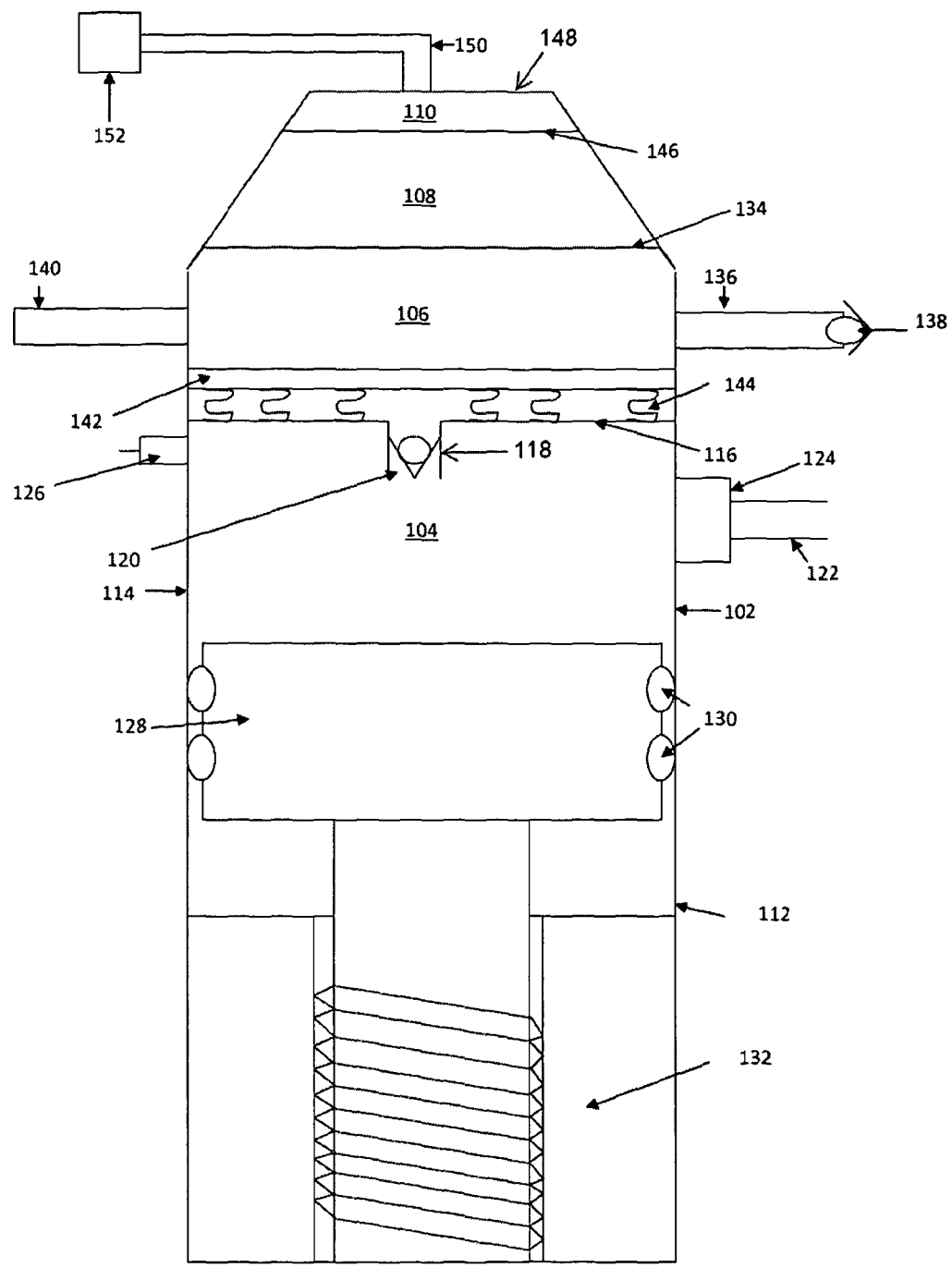
FIG. 5 shows a diagram of a further embodiment of the Fuel Enhancement Chamber, which differs from that of FIG. 2 in that the piston is driven by a screw mechanism, rather than a solenoid.

FIG. 5 shows a diagram of a further embodiment of the Fuel Enhancement Chamber, which differs from that of FIG. 2 in that the piston is driven by a screw mechanism, rather than a solenoid.

EFIE and ELECTRONICS

The system described above and shown in FIG. 1 may be controlled by an EFIE (Electronic Fuel Injection Enhancement) device (20). EFIE devices are known to those skilled in the art. An EFIE is sometimes referred to as an ECU (Engine Control Unit). The EFIE ensures that the engine receives the optimum ignition timing and air/fuel ratio at all RPM and load conditions. Optionally, the EFIE controls the amount of hydrogen and optionally oxygen gas contacted with the hydrocarbon fuel depending on the engine speed. For example, the EFIE can control the ratio 'volumetric rate of delivery of the enriched hydrocarbon fuel to the internal combustion engine (in L/min):volumetric rate of hydrogen in the gas stream containing hydrogen contacted or passed through the hydrocarbon fuel to produce the enriched hydrocarbon fuel (in L/min)', as described above. The engine is also smoother, delivers greater response and maximises fuel efficiency at all RPM and throttle positions. The EFIE can be programmed to recognise driving style and environment. The EFIE can constantly monitor and adjust the engine levels and the system described above to maximise fuel efficiency. A five map EFIE can be programmed to recognise Urban, Motorway, Off road, Load Carrying and Towing conditions, or, in fact, any particular scenario that may be envisaged for the vehicle in question. It can also be programmed to perform in different theatres such as deserts, maritime, high altitude etc. The EFIE may be supplied with a standard set of optimisation parameters but can be simply reprogrammed by down loading updated parameters via the internet and "Flashing" the EFIE memory by USB connection to a laptop.

This EFIE can be reprogrammed easily, which allows the present invention to be employed in a variety of situations, including, if desired, in military applications, as well as allowing the user of the system to remove the system from their vehicle, and attach it to a new vehicle with minimal cost, with the EFIE simply needing to be reprogrammed for the new vehicle. Suitable programmes may be available on-line.

The EFIE also incorporates a timer circuit (19) that allows the engine management system to go through its health check routine prior to switching on the dry cell gas generators; this prevents the vehicle ECU (21) from becoming confused at the difference in combustion characteristics that are present due to the hydrogen/oxygen gas enhancement.

The circuit is completed by the addition of a relay (18), master switch (17) and circuit breaker (16).

EXAMPLES

Example 1—A 2.4 Liter Diesel Car, Standard Manufacturer's Configuration

In the standard configuration, the above vehicle will return, on average, 42 mpg at an average speed of 60 mph. This equates to a fuel usage of 1.43 gallons per hour, or 6.5 liters per hour. The average flow rate of the diesel into the engine is 0.11 liters/min. A standard laboratory built dry cell will return 1.5 liters/min of Hydrogen and Oxygen split in the ratio 2:1 i.e. 1 liter of hydrogen per minute and 0.5 liters of Oxygen per minute at 15 Amps.

Two dry cells used in the configuration described above are configured to produce 3 liters/minute of gas. 1.5 liters is passed through the fuel enhancement device per minute, compressed to 3.5 bars into the diesel fuel to displace nitrogen gas and saturate the fuel at approximately 3 bars. The fuel/vapour residual gas is taken into the air intake where it is mixed with the 1.5 liters of purified gas from the second dry cell and finally into the combustion chamber where it is mixed with the enhanced diesel prior to ignition.

The engine in this configuration will give an increase in mpg of at least 43% (18 mpg), with a corresponding decrease in carbon footprint. The NOx output is reduced to levels approaching zero. The particulates are reduced to levels approaching zero.

Example 2—A 4.0 Liter Petrol Jeep, Standard Manufacturer's Configuration

In the standard configuration, the above vehicle will return, on average, 15 mpg at an average speed of 60 mph. This equates to a fuel usage of 4.0 gallons per hour, or 18.2 liters per hour. The average flow rate of the diesel into the engine is 0.30 liters/min.

A standard laboratory built dry cell is configured to produce 2.0 liters/min of Hydrogen and Oxygen split in the ratio 2:1, i.e. 1.34 liters of hydrogen per minute and 0.66 liters of Oxygen per minute at 20 Amps.

Two dry cells are used in this instance to produce 4.0 liters/minute of gas. 2.0 liters are passed through the fuel enhancement chamber per minute, compressed to 3.5 bars into the petrol to displace nitrogen gas and saturate the fuel at approximately 3 bars. The fuel/vapour residual gas is taken into the air intake where it is mixed with the 2.0 liters of purified gas from the second dry cell and finally into the combustion chamber where it is mixed with the enhanced fuel prior to ignition.

The engine in this configuration will give an increase in mpg of at least 30% (4.5 mpg), with a corresponding decrease in carbon footprint. The NOx output is reduced to levels approaching zero.

Example 3—A 10.5 Liter Diesel Truck, Standard Manufacturer's Configuration

In the standard configuration, the above vehicle will return, on average, 6.7 mpg at an average speed of 40 mph. This equates to a fuel usage of 5.97 gallons per hour, or 27.2 liters per hour. The average flow rate of the diesel into the engine is 0.45 liters/min.

In this case larger volumes of gas are required, necessitating the use of pairs of dry cells in parallel. For the above example, six dry cells, in two groups of three, would be run at 15-20 Amps, to give 9.0-10.0 liters/min of Hydrogen and Oxygen split in the ratio 2:1 i.e. 6.0 liters of hydrogen per minute and 3.0 liters of Oxygen per minute at ~15 Amps.

4.5 liters are passed through the fuel enhancement chamber per minute, compressed to 3.5 bars into the petrol to displace nitrogen gas and saturate the fuel at approximately 3 bars. The fuel/vapour residual gas is taken into the air intake where it is mixed with the 4.5 liters of purified gas from the second dry cell and finally into the combustion chamber where it is mixed with the enhanced fuel prior to ignition.

The engine in this configuration will give an increase in mpg of at least 30% (2.0 mpg), with a corresponding decrease in carbon footprint. The NOx output is reduced to levels approaching zero. The particulates are reduced to levels approaching zero.

In the embodiment described above the effect of compressing the hydrogen and oxygen into the fuel is fourfold:

1/ Some Hydrogen and Oxygen is dissolved into the hydrocarbon fuel itself, causing partial saturation;

2/ Dissolved impurities such as nitrogen are forced OUT of solution by the incoming gas thus preventing any reaction during the combustion process that leads to NOx formation;

3/ The undissolved gas carries heavy fuel vapour with it as it continues on its' journey to the engine inlet manifold, some of which is retained by the semi-permeable membrane; and 4/ The partially saturated fuel has a reduced viscosity which leads to much finer misting on passing through the fuel injection system; this gives much better mixing with the enriched air from the air intake and thus far better burning characteristics (combustion efficiency).

The present inventors have found embodiments of the present invention will provide a number of advantages, including:

1. increasing fuel efficiency, typically measured in mpg, for example, up to 50%, in standard combustion engines running on hydrocarbon fuels;

2. a decreased Carbon Footprint to any vehicle/device using it since its fuel consumption is decreased;

3. reducing and minimising NOx production by displacement of nitrogen from the combustion area and a more efficient combustion cycle in a contained volume;

4. reducing the production of particulates produced in diesel combustion engines by increasing the efficiency of the combustion such that the combustion by-products are almost exclusively gaseous;

5. minimising engine wear by preventing the build up of carbon deposits known to occur using standard fuel/air mixtures.

6. cleaning existing engines of their carbon deposits during the first 1000-2000 km of operation after installation, thus optimising engine conditions;

7. increasing the Service Interval required for oil changes on vehicles since no carbon contamination of the oil can occur whilst the system is running correctly;

8. the ability of the device of the present invention to system to be transferred from one vehicle to another and optimised using programmable EFIE technology;

9. minimising intrusion to other existing vehicle systems, since the device can be compact and requires minimal mechanical interfacing;

10. increasing the performance of poor grade hydrocarbon fuels such that they can be used in vehicles that they would otherwise be unsuitable for;

11. the versatility of the system allowing it to be applied to a wide range of internal combustion engines and vehicles, including marine and aviation vehicles.

In an aspect, the present invention relates to the subject matter as described in the following numbered paragraphs:

1. A process for enriching a hydrocarbon fuel for use in an internal combustion engine, the process comprising:
  (i) contacting a hydrocarbon fuel with a gas stream containing hydrogen gas such that at least some of the hydrogen gas is introduced into the hydrocarbon fuel to produce an enriched hydrocarbon fuel; and
  (ii) delivering the enriched hydrocarbon fuel to an internal combustion engine.

2. The process according to paragraph 1, wherein the process comprises:
  prior to step (i), generating hydrogen gas and oxygen gas in an electrolytic process from water to produce a gas stream containing hydrogen gas and optionally oxygen gas,
  in step (i), contacting the gas stream with the hydrocarbon fuel such that at least some of the hydrogen gas is introduced into the hydrocarbon fuel to produce the enriched hydrocarbon fuel; and
  (ii) delivering the enriched hydrocarbon fuel to the internal combustion engine.

3. A process for enriching a hydrocarbon fuel, the process comprising:
  generating hydrogen gas and oxygen gas in an electrolytic process from water to produce a gas stream containing hydrogen gas and optionally oxygen gas, and
  contacting the gas stream with the hydrocarbon fuel such that at least some of the hydrogen gas is introduced into the hydrocarbon fuel to produce an enriched hydrocarbon fuel.

4. The process according to paragraph 3, wherein the enriched hydrocarbon fuel is delivered to an internal combustion engine.

5. The process according to any one of the preceding paragraphs, wherein the hydrocarbon fuel is a liquid hydrocarbon fuel and, in the contacting of the gas stream with the liquid hydrocarbon fuel, at least some of the hydrogen from the gas stream is dissolved into the hydrocarbon fuel to produce the enriched hydrocarbon fuel.

6. The process according to any one of the preceding paragraphs, wherein the enriched hydrocarbon fuel is heated to a temperature of at least 50° C., and then passed to an internal combustion engine.

7. The process according to paragraph 6, wherein the fuel is subjected to a magnetic field at the same time as it is heated to a temperature of at least 50° C.

8. The process according to any one of the preceding paragraphs, the process comprising:
  generating hydrogen gas and oxygen gas in an electrolytic process from water in a first electrolytic cell to produce a first gas stream containing hydrogen and optionally oxygen,
  generating hydrogen gas and oxygen gas in an electrolytic process from water in a second electrolytic cell to produce a second gas stream containing oxygen and optionally hydrogen;
  contacting the first gas stream with the hydrocarbon fuel such that at least some of the hydrogen gas is introduced into the hydrocarbon fuel to produce an enriched hydrocarbon fuel, and delivering the enriched hydrocarbon fuel to an internal combustion engine,
  delivering the second gas stream to the internal combustion engine, the second gas stream contacting the enriched hydrocarbon fuel in the internal combustion engine.

9. The process according to paragraph 8, wherein the internal combustion engine comprises an air inlet and a fuel inlet for introduction of the fuel into the engine for contacting the fuel with the air from the air inlet, and the first gas stream is introduced into the engine through the fuel inlet and the second gas stream is introduced into the engine through the air inlet.

10. The process according to any one of the preceding paragraphs, wherein the hydrocarbon fuel is a liquid hydrocarbon fuel, and the contacting of the gas stream containing hydrogen gas with the hydrocarbon fuel produces the liquid hydrocarbon fuel and a gaseous mixture, the process further comprising separating the enriched hydrocarbon fuel and the gaseous mixture, delivering the enriched hydrocarbon fuel to the internal combustion engine at a fuel inlet of the internal combustion engine; and delivering the gaseous mixture to the internal combustion engine at an air inlet of the internal combustion engine.

11. The process according to any one of the preceding paragraphs, wherein internal combustion engine is running and unused hydrocarbon fuel from the internal combustion engine is circulated such that, after it has left the internal combustion engine, it is contacted with the gas stream containing hydrogen such that at least some of the hydrogen gas is introduced into the hydrocarbon fuel to produce an enriched hydrocarbon fuel, and then passed back to the internal combustion engine.

12. The process according to any one of the preceding paragraphs, wherein the enriched hydrocarbon fuel is delivered to an internal combustion engine at a volumetric rate of delivery $V_e$ (in L/min); the hydrocarbon fuel is a liquid hydrocarbon fuel and the gas stream containing hydrogen is contacted or passed through the hydrocarbon fuel to produce the enriched hydrocarbon fuel, such that the hydrogen in the gas stream contacts or passes through the hydrocarbon fuel at volumetric rate $V_f$ (in L/min), and the ratio of $V_e:V_f$ is 1:1 to 1:15.

13. The process according to paragraph 12, wherein the ratio $V_e:V_f$ is 1:4 to 1:12.

14. The process according to any one of the preceding paragraphs, wherein the hydrocarbon fuel is a liquid hydrocarbon fuel and the gas stream containing hydrogen is passed through the hydrocarbon fuel under a pressure of about 2 bar or more to produced the enriched hydrocarbon fuel.

15. The process according to paragraph 14, wherein the hydrocarbon fuel is a liquid hydrocarbon fuel and the gas stream containing hydrogen is passed through the hydrocarbon fuel under a pressure of about 3 bar or more to produced the enriched hydrocarbon fuel.

16. A device for enriching hydrocarbon fuel, the device comprising:
 a hydrogen production unit for producing a gas stream containing hydrogen,
 an enriching unit for contacting a hydrocarbon fuel and a gas stream containing hydrogen such that at least some of the hydrogen gas is introduced into the hydrocarbon fuel to produce an enriched hydrocarbon fuel, the hydrogen production unit being in fluid connection with the enriching unit such that the gas stream containing hydrogen is passed to the enriching unit, the enriching unit having an inlet for the hydrocarbon fuel, and
 an outlet for the enriched hydrocarbon fuel.

17. A device for enriching a hydrocarbon fuel according to paragraph 16, wherein the hydrogen production unit comprises an electrolytic cell for generating hydrogen gas and oxygen gas in an electrolytic process from water to produce a gas stream containing hydrogen gas and optionally oxygen gas.

18. The device according to paragraph 16 or paragraph 17, the device comprising a heater in fluid connection with the outlet for the enriched hydrocarbon fuel in the enriching unit, the heater capable of heating the hydrocarbon fuel to a temperature of at least 50° C.

19. The device according to paragraph 18, wherein the heater further comprises a means for subjecting the enriched hydrocarbon fuel within the heater to a magnetic field.

20. The device according to any one of paragraphs 16 to 19, wherein the device comprises:
 (i) a first cell for the electrolytic production of hydrogen and oxygen from water, wherein the first cell is in fluid connection with the enriching unit such that a first gas stream containing hydrogen and optionally oxygen from the first cell is delivered to the enriching unit,
 (ii) a second cell for the electrolytic production of hydrogen and oxygen, wherein the second cell has a conduit for delivery of a second gas stream containing oxygen and optionally hydrogen generated in the second cell to an internal combustion engine, optionally the air intake of the internal combustion engine.

21. An internal combustion engine having a device according to any one of the preceding paragraphs attached thereto, the device having a conduit for delivery of the enriched hydrocarbon fuel from the enriching unit to a fuel and/or air intake of the internal combustion engine.

22. An internal combustion engine according to paragraph 21 having a device according to paragraph 20 attached thereto, wherein the conduit for delivery of the second gas stream is in fluid connection with an air intake of the internal combustion engine.

23. An internal combustion engine according to paragraph 21 or paragraph 22, wherein the engine is adapted such that, in use, unused hydrocarbon fuel from the internal combustion engine is circulated such that, after it has left the internal combustion engine, it is contacted with the gas stream containing hydrogen such that at least some of the hydrogen gas is introduced into the hydrocarbon fuel to produce an enriched hydrocarbon fuel, and then passed back to the internal combustion engine.

24. A vehicle comprising an internal combustion engine according to any one of paragraphs 21 to 23.

In an aspect, the present application relates to the subject matter as described in the following numbered statements:

1. A device for diffusing gas into a liquid, comprising:
 a first gas chamber portion having a gas inlet for introducing gas into the first gas chamber portion;
 a liquid chamber portion having a liquid inlet for introducing liquid into the liquid chamber portion and a liquid outlet, wherein the first gas chamber portion and the liquid chamber portion are in fluid communication with each other; and
 means for pressurising the first gas chamber portion,
 wherein when the first gas chamber portion is pressurised, the gas in the first gas chamber portion is diffused into the liquid in the liquid chamber portion.

2. A device according to statement 1, wherein the means for pressurising the first gas chamber portion may comprise a piston slidably displaceable within the first gas chamber portion.

3. A device according to statement 2, wherein the piston is arranged to be driven by a solenoid.

4. A device according to any one of the preceding statements, wherein the gas inlet in the first gas chamber portion is provided with a gas inlet valve which is arranged to control the supply of gas to the first gas chamber portion.

5. A device according to statement 4, wherein the gas inlet valve is a solenoid valve.

6. A device according to any one of the preceding statements, wherein the first gas chamber portion is provided with a pressure relief valve.

7. A device according to any one of the preceding statements, wherein the device further comprises a non-return valve disposed between the first gas chamber portion and the liquid chamber portion that allows fluid flow from the first gas chamber portion to the liquid chamber portion.

8. A device according to any one of the preceding statements, wherein the non-return valve is operable such that it will not allow gas to pass from the first gas chamber portion to the liquid chamber portion where the pressure in the gas chamber portion is below a predetermined pressure and will allow gas to pass from the first gas chamber portion to the liquid chamber portion at or above the predetermined pressure.

9. A device according to any one of the preceding statements, the device further comprising a diffuser screen disposed within the liquid chamber portion, wherein, in use, the gas passes through the diffuser screen so as to promote uniform diffusion of the gas into the liquid.

10. A device according to statement 9, wherein the liquid chamber portion and the first gas chamber portion are separated from each other by a partition provided with a fluid passageway, wherein the diffuser screen is resiliently biased towards the partition such that when the gas in the first gas chamber portion is pressurised to at least a predetermined pressure the diffuser screen moves away from the partition allowing the pressurised gas to flow to a region of the liquid chamber portion between the partition and the diffuser screen and through the diffuser screen into the liquid in the liquid chamber portion.

11. A device according to any one of the preceding statements, wherein the liquid inlet is provided with a non-return valve that allows fluid flow into the liquid chamber.

12. A device according to any one of the preceding statements, wherein the device further comprises a second gas chamber portion that is in fluid communication with the liquid chamber portion through a semi-permeable membrane, the second gas chamber portion having a gas outlet, wherein, in use, gas can flow from the liquid chamber portion through the semi-permeable membrane into the second gas chamber portion and exit the device through the gas outlet.

13. A device according to statement 12, wherein the gas outlet is provided with a gas outlet valve, which is optionally a solenoid valve.

14. A device according to any one of the preceding statements, wherein the device further comprises an intermediate chamber portion situated between the liquid chamber portion and the second gas chamber portion, the intermediate chamber portion being separated from the liquid chamber portion by a baffle plate and from the second gas chamber portion by the semi-permeable membrane.

15. A device according to any one of the preceding statements, wherein
the liquid inlet of the liquid chamber portion is in fluid connection with a fuel pump, that is adapted to supply the liquid to the liquid inlet at a pressure X,
the first gas chamber portion has an internal volume that can change to change the pressure of the gas within the first gas chamber portion, the first gas chamber portion having a maximum internal volume, Volume A,
the liquid chamber portion has a volume B,
and the ratio of A:B is of from (X+0.1 to 1):1, wherein X is measured in bars.

16. A device according to statement 15, wherein the ratio of A:B is of from (X+0.3 to 0.7):1, wherein X is measured in bars.

17. The device according to statement 15, wherein the ratio of A:B is about (X+0.5):1, wherein X is measured in bars 18. A device for enriching hydrocarbon fuel, the device comprising:
a hydrogen production unit for producing a gas stream containing hydrogen,
an enriching unit for contacting a hydrocarbon fuel and a gas stream containing hydrogen such that at least some of the hydrogen gas is introduced into the hydrocarbon fuel to produce an enriched hydrocarbon fuel, the hydrogen production unit being in fluid connection with the enriching unit such that the gas stream containing hydrogen is passed to the enriching unit, the enriching unit having an inlet for the hydrocarbon fuel, and
an outlet for the enriched hydrocarbon fuel,
wherein the enriching unit comprises or is a device for diffusing gas into a liquid in accordance with any one of statements 1 to 17, the inlet for the hydrocarbon fuel being or being in fluid connection with a liquid inlet in the liquid chamber portion, the outlet for the enriched hydrocarbon fuel being or being in fluid connection with the liquid outlet in the liquid chamber portion, and the gas inlet in the first gas chamber portion being in fluid connection with the enriching unit such that the gas stream containing hydrogen is passed to the first gas chamber portion.

19. A device according to statement 18, wherein the hydrogen production unit comprises an electrolytic cell for generating hydrogen gas and oxygen gas in an electrolytic process from water to produce a gas stream containing hydrogen gas and optionally oxygen gas.

20. An internal combustion engine having a device for diffusing gas into a liquid according to any one of statements 1 to 17 attached thereto, such that the fuel outlet in the device is in fluid communication with a fuel inlet in the internal combustion engine.

21. An internal combustion engine having a device for enriching hydrocarbon fuel in accordance with statement 18 attached thereto, such that the fuel outlet in the device is in fluid communication with a fuel inlet in the internal combustion engine.

22. An internal combustion engine according to statement 20 or 21, the internal combustion engine having one or more fuel injector pumps, a fuel tank, the liquid inlet of the device for diffusing gas into a liquid is in fluid communication with the vehicle fuel tank, the gas inlet of the device for diffusing gas into a liquid is in fluid communication with the hydrogen production unit, and the liquid outlet is in fluid communication with the one or more fuel injector pumps of the internal combustion engine.

23. A method for diffusing a gas into a liquid, the method comprising
providing a device for diffusing gas into a liquid in accordance with any one of statements 1 to 17,
introducing a gas into the first gas chamber portion through the gas inlet in the first chamber portion at a first pressure,
introducing a liquid into the liquid chamber portion,
increasing the pressure of the gas in the first chamber portion to at least a second pressure, wherein, at the second pressure, the gas from the first chamber portion is diffused into the liquid into the second chamber portion.

24. The method according to statement 23 wherein the gas introduced into the first gas chamber portion is a gas stream containing hydrogen and the liquid introduced into the liquid chamber portion comprises a hydrocarbon fuel.

25. The method according to statement 24, wherein the diffusing of the gas stream comprising hydrogen into the hydrocarbon fuel produces an enriched hydrocarbon fuel, the enriched hydrocarbon fuel being delivered to an internal combustion engine.

26. The method according to any one of statements 23 to 25, wherein the method further comprises
generating hydrogen gas and oxygen gas in an electrolytic process from water to produce a gas stream containing hydrogen gas and optionally oxygen gas, introducing the gas stream into the first gas chamber portion through the gas inlet, and
the liquid introduced into the liquid chamber portion comprises a hydrocarbon fuel.

27. The method according to any one of statements 23 to 26, wherein the first gas chamber portion has an internal volume that can change to change the pressure of the gas within the first gas chamber portion, the first gas chamber portion having a maximum internal volume A,
the liquid chamber portion has a volume B,
the liquid supplied to the gas chamber portion comprises a hydrocarbon fuel supplied by a fuel pump at a pressure X,
the gas introduced into the first gas chamber portion is a gas stream comprising hydrogen,
and the ratio of A:B is of from (X+0.1 to 1):1, wherein X is measured in bars.

28. The method according to statement 27, wherein the ratio of A:B is of from (X+0.3 to 0.7):1, wherein X is measured in bars.

29. The method according to statement 29, wherein the ratio of A:B is about (X+0.5):1, wherein X is measured in bars.

30. A vehicle comprising an internal combustion engine according to any one of statements 20 to 22.

In an aspect, the present application relates to the subject matter in the following numbered clauses:

1. A process for enriching a hydrocarbon fuel, the process comprising:
generating hydrogen gas and oxygen gas in an electrolytic process from water to produce a gas stream containing hydrogen gas and optionally oxygen gas, and
removing in a purification unit at least one or more species other than hydrogen from the gas stream and then either:
(a) (i) contacting a hydrocarbon fuel with the gas stream containing hydrogen gas such that at least some of the hydrogen gas is introduced into the hydrocarbon fuel to produce an enriched hydrocarbon fuel; and
(ii) delivering the enriched hydrocarbon fuel to an internal combustion engine; or
(b) delivering the gas stream containing hydrogen gas to an internal combustion engine for combustion with fuel supplied to the engine.

2. A process according to clause 1, wherein the purification unit removes a species from the gas stream that is soluble in water.

3. A process according to clause 1 or clause 2, wherein the purification unit comprises one or more chambers containing a polar liquid medium, the one or more chambers being adapted for passing the gas stream containing hydrogen through the polar liquid medium in the one or more chambers.

4. A process according to clause 3, wherein the polar liquid medium comprises a polar protic solvent.

5. A process according to clause 3, wherein the polar liquid medium comprises water.

6. A process according to any one of the preceding clauses, wherein the purification unit comprises one or more desiccation units for removal of water from the gas stream.

7. A process according to clause 6, wherein the desiccation unit comprises a molecular sieve.

8. A process according to clause 7, wherein the desiccation unit comprises a zeolite selected from zeolite 3A, 4A, 5A and 13X.

9. A process according to any one of clauses 6 to 8, wherein the desiccation unit comprises a first chamber having a first wall, a second wall and one or more third walls, wherein the first and second walls are permeable to hydrogen and water, and the one or more third walls is impermeable to hydrogen and water, and one or more molecular sieves are disposed in the chamber, and wherein the first wall and second wall comprise a porous sintered metal for allowing the gas stream containing hydrogen to pass through the pores of the sintered metal, the sintered metal substantially preventing passage of the one or more molecular sieves through the pores of the sintered metal.

10. A process according to clause 9, wherein preferably, the desiccation unit further comprises (i) a second chamber disposed on the opposite side of the first wall, the second chamber being substantially free of the one or more materials for the removal of water from a gas; and/or
(ii) a third chamber disposed on the opposite side of the second wall, the third chamber being substantially free of the one or more materials for the removal of water from a gas,
wherein the second chamber defines a void that can be filled with the gas stream containing hydrogen, such that the gas stream contacts substantially all of the surface of the first wall, to allow its passage through to the first chamber.

11. A process according to any one of the preceding clauses, wherein the purification unit comprises a unit comprising one or more chambers containing a polar liquid medium, the one or more chambers being adapted for passing the gas stream containing hydrogen through the polar liquid medium in the one or more chambers, and a desiccation unit in fluid connection with the one or more chambers containing a polar liquid medium, such that the gas stream is first passed through the one or more chambers containing the polar liquid medium and contacted with the polar liquid medium, and then passed to the desiccation unit.

12. A device for use in the process of any one of the preceding clauses, the device comprising:
an electrolytic cell for generating hydrogen gas and oxygen gas in an electrolytic process from water, the electrolytic cell, in use, producing a gas stream containing hydrogen and optionally oxygen,
a purification unit for removing at least one or more species other than hydrogen from the gas stream, the purification unit being in fluid connection with the electrolytic cell, such that the gas stream is delivered to the purification unit.

13. A device according to clause 12, wherein the purification unit removes a species from the gas stream that is soluble in water.

14. A device according to clause 12 or clause 13, wherein the purification unit comprises one or more chambers containing a polar liquid medium, the one or more chambers being adapted for passing the gas stream containing hydrogen through the polar liquid medium in the one or more chambers.

15. A device according to clause 14, wherein the polar liquid medium comprises a polar protic solvent.

16. A device according to clause 14, wherein the polar liquid medium comprises water.

17. A device according to any one of clauses 12 to 16, wherein the purification unit comprises one or more desiccation units for removal of water from the gas stream.

18. A device according to clause 17, wherein the desiccation unit comprises a molecular sieve.

19. A device according to clause 18, wherein the desiccation unit comprises a zeolite selected from zeolite 3A, 4A, 5A and 13X.

20. A device according to any one of clauses 17 to 19, wherein the desiccation unit comprises a first chamber having a first wall, a second wall and one or more third walls, wherein the first and second walls are permeable to hydrogen and water, and the one or more third walls is impermeable to hydrogen and water, and one or more molecular sieves are disposed in the chamber, and wherein the first wall and second wall comprise a porous sintered metal for allowing the gas stream containing hydrogen to pass through the pores of the sintered metal, the sintered metal substantially preventing passage of the one or more molecular sieves through the pores of the sintered metal.

21. A device according to clause 20, wherein preferably, the desiccation unit further comprises (i) a second chamber disposed on the opposite side of the first wall, the second chamber being substantially free of the one or more materials for the removal of water from a gas; and/or
(ii) a third chamber disposed on the opposite side of the second wall, the third chamber being substantially free of the one or more materials for the removal of water from a gas,
wherein the second chamber defines a void that can be filled with the gas stream containing hydrogen, such that the gas stream contacts substantially all of the surface of the first wall, to allow its passage through to the first chamber.

22. A device according to any one clauses 12 to 21, wherein the purification unit comprises a unit comprising one or more chambers containing a polar liquid medium, the one or more chambers being adapted for passing the gas stream containing hydrogen through the polar liquid medium in the one or more chambers, and a desiccation unit in fluid connection with the one or more chambers containing a polar liquid medium, such that the gas stream is first passed through the one or more chambers containing the polar liquid medium and contacted with the polar liquid medium, and then passed to the desiccation unit.

23. A device for enriching hydrocarbon fuel, the device comprising:
(i) a hydrogen production unit for producing a gas stream containing hydrogen;
(ii) an enriching unit for contacting a hydrocarbon fuel and a gas stream containing hydrogen such that at least some of the hydrogen gas is introduced into the hydrocarbon fuel to produce an enriched hydrocarbon fuel, the hydrogen production unit being in fluid connection with the enriching unit such that the gas stream containing hydrogen is passed to the enriching unit, the enriching unit having an inlet for the hydrocarbon fuel, and
an outlet for the enriched hydrocarbon fuel;
a purification unit as defined in any one of clauses 12 to 22,
wherein the hydrogen production unit comprises an electrolytic cell for generating hydrogen gas and oxygen gas in an electrolytic process from water, the electrolytic cell, in use, producing the gas stream containing hydrogen and optionally oxygen,
and wherein the device for enriching hydrocarbon fuel is adapted such that the gas stream containing hydrogen produced in the electrolytic cell is passed through the purification device before being passed to the enriching unit.

24. An internal combustion engine having a device of any one of clauses 12 to 22 attached thereto, the device having a conduit for delivery of the gas stream from the purification unit to the internal combustion engine.

25. An internal combustion engine according to clause 24, wherein the gas stream from the purification unit is, in use, delivered to the internal combustion engine through an air inlet of the internal combustion engine.

The invention claimed is:

1. A process for enriching a hydrocarbon fuel for use in an internal combustion engine, the process comprising:
   (i) contacting a liquid hydrocarbon fuel with a gas stream comprising hydrogen gas and oxygen gas in an enriching unit, the contacting comprising passing the gas stream through the hydrocarbon fuel under a pressure of more than 1 bar such that at least some of the hydrogen gas and the oxygen gas is dissolved into the hydrocarbon fuel to produce an enriched hydrocarbon fuel and a gaseous mixture containing nitrogen displaced from the fuel by the dissolution of hydrogen and oxygen gas into the fuel; and
   (ii) separating the enriched hydrocarbon fuel from the gaseous mixture containing nitrogen, and then (a) passing the gaseous mixture containing nitrogen out of an outlet of the enriching unit, with the gaseous mixture either then being vented to the atmosphere or delivered to the internal combustion engine at an air inlet of the internal combustion engine and (b) delivering the enriched hydrocarbon fuel to the internal combustion engine at a fuel inlet of the internal combustion engine.

2. The process according to claim 1, wherein passing the gas stream through the hydrocarbon fuel under wherein the pressure is more than 2 bar.

3. The process according to claim 1, wherein the process comprises:
   prior to step (i), generating hydrogen gas and oxygen gas in an electrolytic process from water to produce a gas stream containing hydrogen gas and oxygen gas,
   in step (i), contacting the gas stream with the hydrocarbon fuel such that at least some of the hydrogen gas, and, if present, oxygen gas is introduced into the hydrocarbon fuel to produce the enriched hydrocarbon fuel.

4. The process according to claim 1, wherein the enriched hydrocarbon fuel is delivered to an internal combustion engine.

5. The process according to claim 4, wherein the internal combustion engine is running and unused hydrocarbon fuel from the internal combustion engine is circulated such that, after it has left the internal combustion engine, it is contacted with the gas stream containing hydrogen such that at least some of the hydrogen gas is introduced into the hydrocarbon fuel to produce an enriched hydrocarbon fuel, and then passed back to the internal combustion engine.

6. The process according to claim 1, wherein the enriched hydrocarbon fuel is heated to a temperature of at least 50° C., and then passed to an internal combustion engine.

7. The process according to claim 6, wherein the fuel is subjected to a magnetic field at the same time as it is heated to a temperature of at least 50° C.

8. The process according to claim 1, the process comprising:

generating hydrogen gas and oxygen gas in an electrolytic process from water in a first electrolytic cell to produce a first gas stream containing hydrogen and optionally oxygen;

generating hydrogen gas and oxygen gas in an electrolytic process from water in a second electrolytic cell to produce a second gas stream containing oxygen and optionally hydrogen;

contacting the first gas stream with the hydrocarbon fuel such that at least some of the hydrogen gas is introduced into the hydrocarbon fuel to produce an enriched hydrocarbon fuel, and delivering the enriched hydrocarbon fuel to an internal combustion engine; and delivering the second gas stream to the internal combustion engine, the second gas stream contacting the enriched hydrocarbon fuel in the internal combustion engine.

9. The process according to claim 8, wherein the internal combustion engine comprises an air inlet and a fuel inlet for introduction of the fuel into the engine for contacting the fuel with the air from the air inlet, and the first gas stream is introduced into the engine through the fuel inlet and the second gas stream is introduced into the engine through the air inlet.

10. The process according to claim 1, further comprising:

delivering the enriched hydrocarbon fuel to the internal combustion engine at a fuel inlet of the internal combustion engine; and delivering the gaseous mixture to the internal combustion engine at an air inlet of the internal combustion engine.

* * * * *